(12) United States Patent
Nguyen et al.

(10) Patent No.: US 9,954,679 B2
(45) Date of Patent: Apr. 24, 2018

(54) USING END-USER FEDERATED LOGIN TO DETECT A BREACH IN A KEY EXCHANGE ENCRYPTED CHANNEL

(71) Applicant: QUALCOMM Incorporated, San Diego, CA (US)

(72) Inventors: Phil Tien Nguyen, San Diego, CA (US); Cameron Allen George McDonald, Queenscliff (AU); Gregory Burns, Seattle, WA (US)

(73) Assignee: QUALCOMM Incorporated, San Diego, CA (US)

(*) Notice: Subject to any disclaimer, the term of this patent is extended or adjusted under 35 U.S.C. 154(b) by 309 days.

(21) Appl. No.: 14/638,290

(22) Filed: Mar. 4, 2015

(65) Prior Publication Data

US 2015/0256337 A1 Sep. 10, 2015

Related U.S. Application Data

(60) Provisional application No. 61/948,433, filed on Mar. 5, 2014.

(51) Int. Cl.
*H04L 9/08* (2006.01)
*H04L 9/32* (2006.01)
(Continued)

(52) U.S. Cl.
CPC .............. *H04L 9/0841* (2013.01); *H04L 9/32* (2013.01); *H04L 9/3271* (2013.01);
(Continued)

(58) Field of Classification Search
CPC ....... H04L 9/0841; H04L 9/3271; H04L 9/32; H04L 63/0823; H04L 63/0815;
(Continued)

(56) References Cited

U.S. PATENT DOCUMENTS 8,509,431 B2   8/2013   Schmidt et al.
8,613,070 B1 * 12/2013   Borzycki ............ G06F 21/6218
                                                          726/8
(Continued)

FOREIGN PATENT DOCUMENTS

EP      1833216 A1    9/2007
WO   2011128183 A2   10/2011

OTHER PUBLICATIONS

Josephson, William et al., "Peer-to-Peer Authentication with a Distributed Single Sign-On Service", : IPTPS 2004, LNCS 3279, pp. 250-258.*

(Continued)

*Primary Examiner* — Michael Pyzocha
(74) *Attorney, Agent, or Firm* — Muncy, Geissler, Olds & Lowe, P.C.

(57) ABSTRACT

Disclosed are methods and systems for authenticating a key exchange between a first peer device and a second peer device. In an aspect, the first peer device sends federated login credentials of a user and a first identifier to a first federated login provider, receives a first authentication response from the first federated login provider, receives a second authentication response from the second peer device, authenticates the second authentication response with a second federated login provider, sends the first authentication response to the second peer device, receives an acknowledgment from the second peer device indicating that the second peer device has authenticated the first authentication response with the federated login provider, sends an acknowledgment to the second peer device indicating that the first peer device has authenticated the second authentication response, and authenticates the key exchange based on the acknowledgment from the second peer device.

30 Claims, 19 Drawing Sheets

(51) Int. Cl.
*H04L 29/06* (2006.01)
*H04L 29/08* (2006.01)
*H04W 4/00* (2018.01)
*H04W 12/06* (2009.01)

(52) U.S. Cl.
CPC ...... *H04L 63/0815* (2013.01); *H04L 63/0823* (2013.01); *H04L 67/141* (2013.01); *H04W 4/005* (2013.01); *H04W 4/008* (2013.01); *H04W 12/06* (2013.01); *H04L 2209/24* (2013.01)

(58) Field of Classification Search
CPC .. H04L 67/141; H04L 2209/24; H04W 4/005; H04W 4/008; H04W 12/06
USPC .......................................................... 713/171
See application file for complete search history.

(56) References Cited

U.S. PATENT DOCUMENTS

| | | | | |
|---|---|---|---|---|
| 8,799,656 | B2* | 8/2014 | Brickell | H04L 9/0844 380/282 |
| 9,306,748 | B2* | 4/2016 | Baek | H04L 9/321 |
| 9,497,627 | B2* | 11/2016 | De Foy | H04W 12/06 |
| 2003/0233551 | A1* | 12/2003 | Kouznetsov | G06F 17/30209 713/175 |
| 2006/0053289 | A1* | 3/2006 | Singh | H04L 9/3273 713/169 |
| 2008/0040606 | A1* | 2/2008 | Narayanan | H04L 63/08 713/169 |
| 2009/0287922 | A1* | 11/2009 | Herwono | H04L 9/0822 713/155 |
| 2010/0228767 | A1 | 9/2010 | Slinker et al. | |
| 2011/0296186 | A1* | 12/2011 | Wong | H04L 63/0272 713/171 |
| 2011/0314287 | A1 | 12/2011 | Escott et al. | |
| 2012/0291114 | A1* | 11/2012 | Poliashenko | G06F 21/41 726/8 |
| 2013/0080769 | A1 | 3/2013 | Cha et al. | |
| 2013/0227658 | A1 | 8/2013 | Leicher et al. | |
| 2014/0230027 | A1* | 8/2014 | Cha | H04L 63/0815 726/5 |

OTHER PUBLICATIONS

Li, Xinxhi et al., "Towards an Equitable Federated Name Service for the Internet of Things", 2013 IEEE International Conference on Green Computing and Communications and IEEE Internet of Things and IEEE Cyber, Physical and Social Computing, pp. 1109-1115.*
International Search Report and Written Opinion—PCT/US2015/019006—ISA/EPO—dated May 20, 2015.
Menezes, et al., "Handbook of Applied Cryptography", 1997, CRC Press LLC, USA, XP001525013, pp. 543-590, p. 543-p. 590.
Guo B., et al., "From the internet of things to embedded intelligence," 2012, pp. 1-29.

* cited by examiner

USING END-USER FEDERATED LOGIN TO DETECT A BREACH IN A KEY EXCHANGE ENCRYPTED CHANNEL

CROSS-REFERENCE TO RELATED APPLICATIONS

The present Application for Patent claims the benefit of U.S. Provisional Application No. 61/948,433, entitled "USING END-USER FEDERATED LOGIN TO DETECT A BREACH IN A DIFFIE-HELLMAN KEY EXCHANGE ENCRYPTED CHANNEL," filed Mar. 5, 2014, assigned to the assignee hereof, and expressly incorporated herein by reference in its entirety.

TECHNICAL FIELD

Various embodiments described herein generally relate to using end-user federated login to detect a breach in a key exchange encrypted channel.

BACKGROUND

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet).

A number of market trends are driving development of IoT devices. For example, increasing energy costs are driving governments' strategic investments in smart grids and support for future consumption, such as for electric vehicles and public charging stations. Increasing health care costs and aging populations are driving development for remote/ connected health care and fitness services. A technological revolution in the home is driving development for new "smart" services, including consolidation by service providers marketing 'N' play (e.g., data, voice, video, security, energy management, etc.) and expanding home networks. Buildings are getting smarter and more convenient as a means to reduce operational costs for enterprise facilities.

There are a number of key applications for the IoT. For example, in the area of smart grids and energy management, utility companies can optimize delivery of energy to homes and businesses while customers can better manage energy usage. In the area of home and building automation, smart homes and buildings can have centralized control over virtually any device or system in the home or office, from appliances to plug-in electric vehicle (PEV) security systems. In the field of asset tracking, enterprises, hospitals, factories, and other large organizations can accurately track the locations of high-value equipment, patients, vehicles, and so on. In the area of health and wellness, doctors can remotely monitor patients' health while people can track the progress of fitness routines.

SUMMARY

The following presents a simplified summary relating to one or more aspects and/or embodiments associated with the mechanisms disclosed herein to using end-user federated login to detect a breach in a key exchange encrypted channel. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Disclosed are systems and methods for authenticating a key exchange between a first peer device and a second peer device. A method of authenticating a key exchange between a first peer device and a second peer device includes sending, by the first peer device, federated login credentials of a user of the first peer device and a first identifier to a first federated login provider, wherein the second peer device sends the federated login credentials of the user and a second identifier to a second federated login provider, receiving, by the first peer device, a first authentication response from the first federated login provider, wherein the second peer device receives a second authentication response from the second federated login provider, receiving, by the first peer device, the second authentication response from the second peer device, authenticating, by the first peer device, the second authentication response with the second federated login provider, sending, by the first peer device, the first authentication response to the second peer device, wherein the second peer device authenticates the first authentication response with the first federated login provider, receiving, by the first peer device, an acknowledgment from the second peer device indicating that the second peer device has authenticated the first authentication response, sending, by the first peer device, an acknowledgment to the second peer device indicating that the first peer device has authenticated the second authentication response, and authenticating, by the first peer device, the key exchange based on the acknowledgment from the second peer device, wherein the second peer device authenticates the key exchange based on the acknowledgment from the first peer device.

An apparatus for authenticating a key exchange between a first peer device and a second peer device includes logic configured to send, by the first peer device, federated login credentials of a user of the first peer device and a first identifier to a first federated login provider, wherein the second peer device sends the federated login credentials of the user and a second identifier to a second federated login provider, logic configured to receive, by the first peer device, a first authentication response from the first federated login provider, wherein the second peer device receives a second authentication response from the second federated login provider, logic configured to receive, by the first peer device, the second authentication response from the second peer device, logic configured to authenticate, by the first peer device, the second authentication response with the second federated login provider, logic configured to send, by the first peer device, the first authentication response to the second peer device, wherein the second peer device authenticates the first authentication response with the first federated login provider, logic configured to receive, by the first peer device, an acknowledgment from the second peer device indicating that the second peer device has authenticated the first authentication response, logic configured to send, by the first peer device, an acknowledgment to the second peer device indicating that the first peer device has authenticated the second authentication response, and logic configured to authenticate, by the first peer device, the key exchange based on the acknowledgment from the second peer device, wherein the second peer device authenticates the key exchange based on the acknowledgment from the first peer device.

An apparatus for authenticating a key exchange between a first peer device and a second peer device includes means for sending, by the first peer device, federated login credentials of a user of the first peer device and a first identifier to a first federated login provider, wherein the second peer device sends the federated login credentials of the user and a second identifier to a second federated login provider, means for receiving, by the first peer device, a first authentication response from the first federated login provider, wherein the second peer device receives a second authentication response from the second federated login provider, means for receiving, by the first peer device, the second authentication response from the second peer device, means for authenticating, by the first peer device, the second authentication response with the second federated login provider, means for sending, by the first peer device, the first authentication response to the second peer device, wherein the second peer device authenticates the first authentication response with the first federated login provider, means for receiving, by the first peer device, an acknowledgment from the second peer device indicating that the second peer device has authenticated the first authentication response, means for sending, by the first peer device, an acknowledgment to the second peer device indicating that the first peer device has authenticated the second authentication response, and means for authenticating, by the first peer device, the key exchange based on the acknowledgment from the second peer device, wherein the second peer device authenticates the key exchange based on the acknowledgment from the first peer device.

A non-transitory computer-readable medium for authenticating a key exchange between a first peer device and a second peer device includes at least one instruction to send, by the first peer device, federated login credentials of a user of the first peer device and a first identifier to a first federated login provider, wherein the second peer device sends the federated login credentials of the user and a second identifier to a second federated login provider, at least one instruction to receive, by the first peer device, a first authentication response from the first federated login provider, wherein the second peer device receives a second authentication response from the second federated login provider, at least one instruction to receive, by the first peer device, the second authentication response from the second peer device, at least one instruction to authenticate, by the first peer device, the second authentication response with the second federated login provider, at least one instruction to send, by the first peer device, the first authentication response to the second peer device, wherein the second peer device authenticates the first authentication response with the first federated login provider, at least one instruction to receive, by the first peer device, an acknowledgment from the second peer device indicating that the second peer device has authenticated the first authentication response, at least one instruction to send, by the first peer device, an acknowledgment to the second peer device indicating that the first peer device has authenticated the second authentication response, and at least one instruction to authenticate, by the first peer device, the key exchange based on the acknowledgment from the second peer device, wherein the second peer device authenticates the key exchange based on the acknowledgment from the first peer device.

Other objects and advantages associated with the mechanisms disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which:

FIG. 2A illustrates an exemplary Internet of Things (IoT) device in accordance with aspects of the disclosure, while

DETAILED DESCRIPTION

Figure 1A:
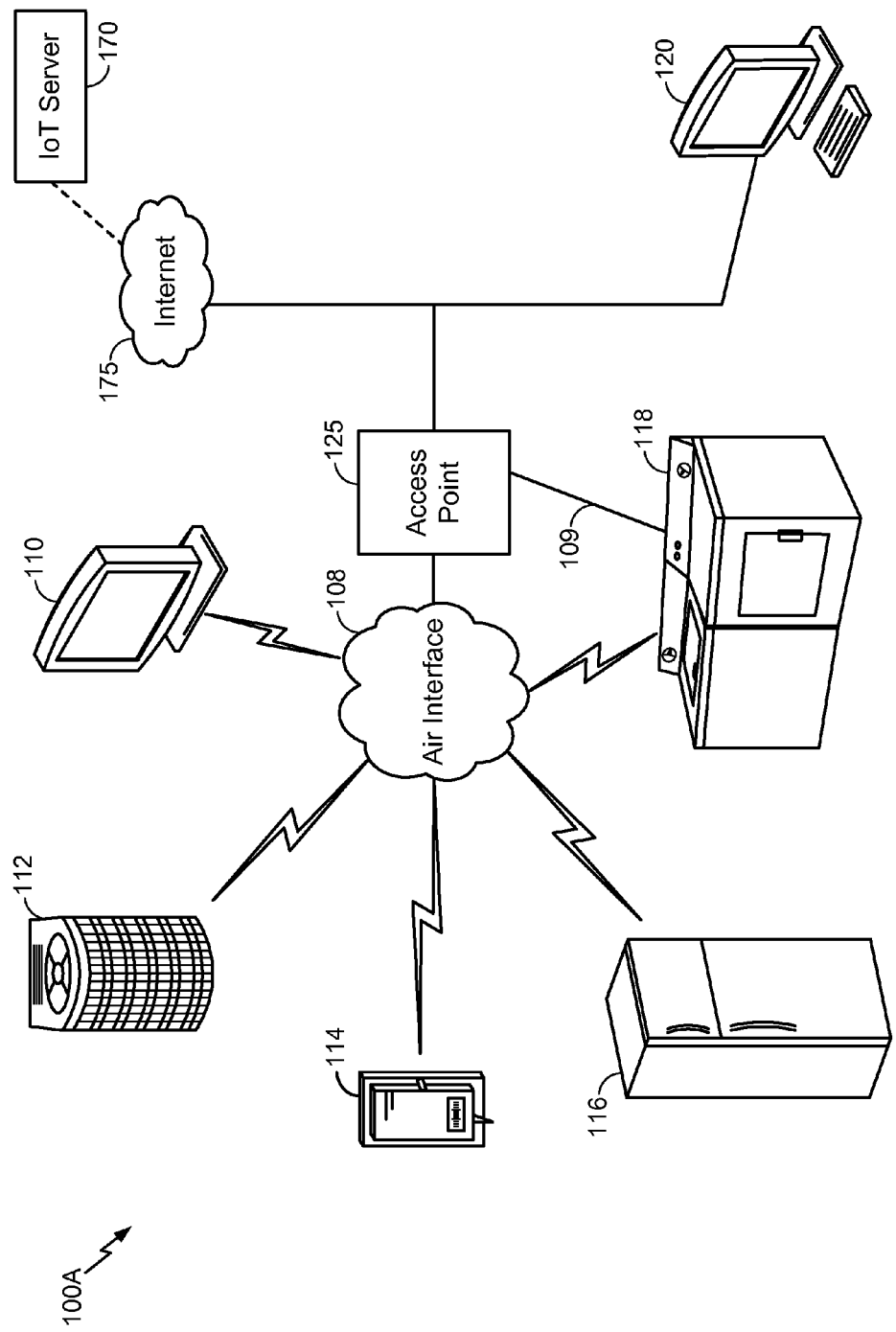
FIG. 1A illustrates a high-level system architecture of a wireless communications system in accordance with an aspect of the disclosure.

The disclosure is directed to methods and systems for authenticating a key exchange between a first peer device and a second peer device. In an aspect, the first peer device sends federated login credentials of a user of the first peer device and a first identifier to a first federated login provider, wherein the second peer device sends the federated login credentials of the user and a second identifier to a second federated login provider, receives a first authentication response from the first federated login provider, wherein the second peer device receives a second authentication response from the second federated login provider, receives the second authentication response from the second peer device, authenticates the second authentication response with the second federated login provider, sends the first authentication response to the second peer device, wherein the second peer device authenticates the first authentication response with the first federated login provider, receives an acknowledgment from the second peer device indicating that the second peer device has authenticated the first authentication response, sends an acknowledgment to the second peer device indicating that the first peer device has authenticated the second authentication response, and authenticates the key exchange based on the acknowledgment from the second peer device, wherein the second peer device authenticates the key exchange based on the acknowledgment from the first peer device.

These and other aspects are disclosed in the following description and related drawings to show specific examples relating to exemplary embodiments of the disclosure. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the term "Internet of Things device" (or "IoT device") may refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, smartphones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

FIG. 1A illustrates a high-level system architecture of a wireless communications system 100A in accordance with an aspect of the disclosure. The wireless communications system 100A contains a plurality of IoT devices, which include a television 110, an outdoor air conditioning unit 112, a thermostat 114, a refrigerator 116, and a washer and dryer 118.

Referring to FIG. 1A, IoT devices 110-118 are configured to communicate with an access network (e.g., an access point 125) over a physical communications interface or layer, shown in FIG. 1A as air interface 108 and a direct wired connection 109. The air interface 108 can comply with a wireless Internet protocol (IP), such as IEEE 802.11. Although FIG. 1A illustrates IoT devices 110-118 communicating over the air interface 108 and IoT device 118 communicating over the direct wired connection 109, each IoT device may communicate over a wired or wireless connection, or both.

The Internet 175 includes a number of routing agents and processing agents (not shown in FIG. 1A for the sake of convenience). The Internet 175 is a global system of interconnected computers and computer networks that uses a standard Internet protocol suite (e.g., the Transmission Control Protocol (TCP) and IP) to communicate among disparate devices/networks. TCP/IP provides end-to-end connectivity specifying how data should be formatted, addressed, transmitted, routed and received at the destination.

In FIG. 1A, a computer 120, such as a desktop or personal computer (PC), is shown as connecting to the Internet 175 directly (e.g., over an Ethernet connection or Wi-Fi or 802.11-based network). The computer 120 may have a wired connection to the Internet 175, such as a direct connection to a modem or router, which, in an example, can correspond to the access point 125 itself (e.g., for a Wi-Fi router with both wired and wireless connectivity). Alternatively, rather than being connected to the access point 125 and the Internet 175 over a wired connection, the computer 120 may be connected to the access point 125 over air interface 108 or another wireless interface, and access the Internet 175 over the air interface 108. Although illustrated as a desktop computer, computer 120 may be a laptop computer, a tablet computer, a PDA, a smart phone, or the like. The computer 120 may be an IoT device and/or contain functionality to manage an IoT network/group, such as the network/group of IoT devices 110-118.

The access point 125 may be connected to the Internet 175 via, for example, an optical communication system, such as FiOS, a cable modem, a digital subscriber line (DSL) modem, or the like. The access point 125 may communicate with IoT devices 110-120 and the Internet 175 using the standard Internet protocols (e.g., TCP/IP).

Referring to FIG. 1A, an IoT server 170 is shown as connected to the Internet 175. The IoT server 170 can be implemented as a plurality of structurally separate servers, or alternately may correspond to a single server. In an aspect, the IoT server 170 is optional (as indicated by the dotted line), and the group of IoT devices 110-120 may be a peer-to-peer (P2P) network. In such a case, the IoT devices 110-120 can communicate with each other directly over the air interface 108 and/or the direct wired connection 109. Alternatively, or additionally, some or all of IoT devices 110-120 may be configured with a communication interface independent of air interface 108 and direct wired connection 109. For example, if the air interface 108 corresponds to a Wi-Fi interface, one or more of the IoT devices 110-120 may have Bluetooth or NFC interfaces for communicating directly with each other or other Bluetooth or NFC-enabled devices.

In a peer-to-peer network, service discovery schemes can multicast the presence of nodes, their capabilities, and group membership. The peer-to-peer devices can establish associations and subsequent interactions based on this information.

Figure 1B:
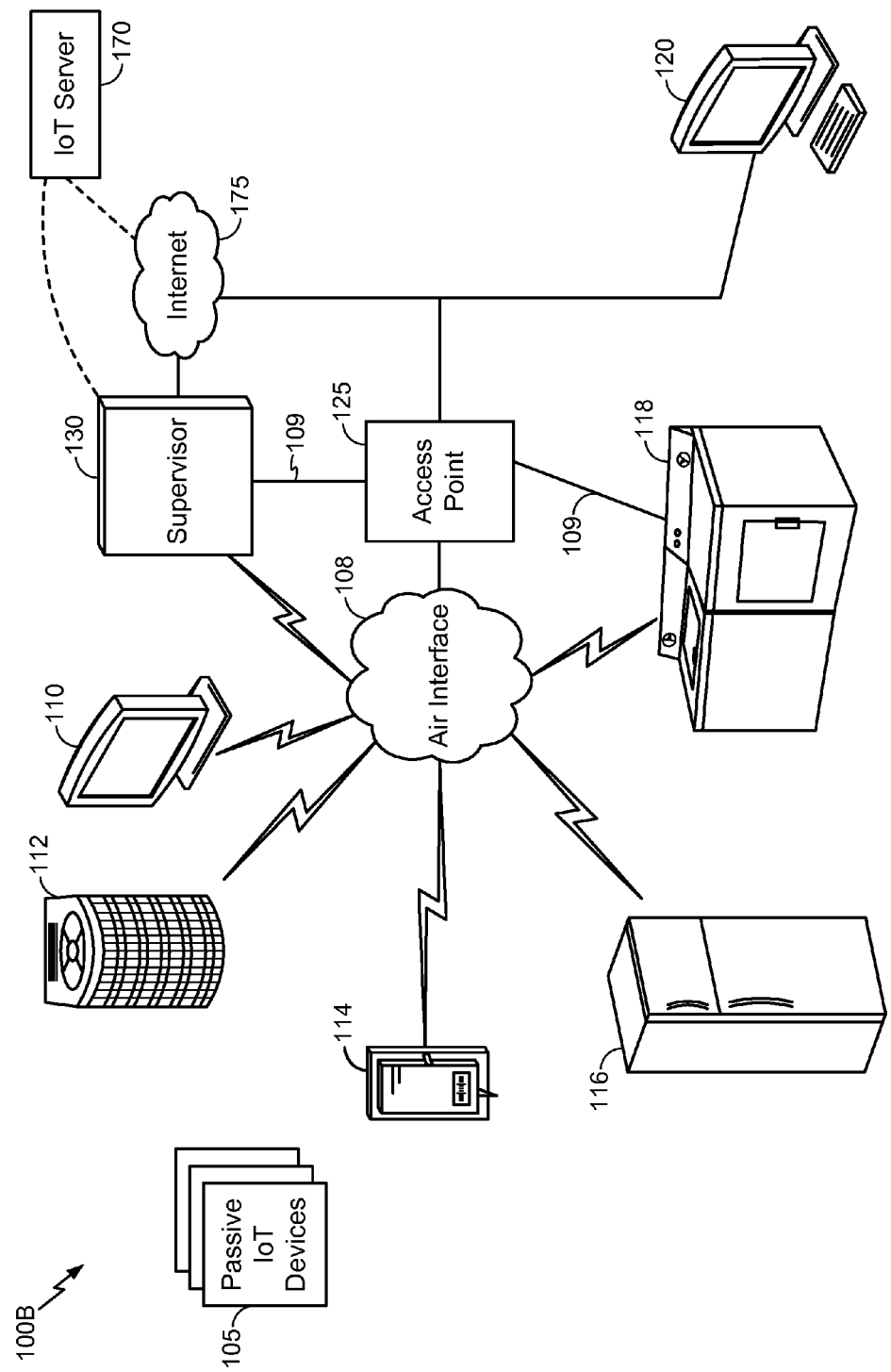
FIG. 1B illustrates a high-level system architecture of a wireless communications system in accordance with another aspect of the disclosure.

In accordance with an aspect of the disclosure, FIG. 1B illustrates a high-level architecture of another wireless communications system 100B that contains a plurality of IoT devices. In general, the wireless communications system 100B shown in FIG. 1B may include various components that are the same and/or substantially similar to the wireless communications system 100A shown in FIG. 1A, which was described in greater detail above (e.g., various IoT devices, including a television 110, outdoor air conditioning unit 112, thermostat 114, refrigerator 116, and washer and dryer 118, that are configured to communicate with an access point 125 over an air interface 108 and/or a direct wired connection 109, a computer 120 that directly connects to the Internet 175 and/or connects to the Internet 175 through access point 125, and an IoT server 170 accessible via the Internet 175, etc.). As such, for brevity and ease of description, various details relating to certain components in the wireless communications system 100B shown in FIG. 1B may be omitted herein to the extent that the same or similar details have already been provided above in relation to the wireless communications system 100A illustrated in FIG. 1A.

Referring to FIG. 1B, the wireless communications system 100B may include a supervisor device 130, which may alternatively be referred to as an IoT manager 130 or IoT manager device 130. As such, where the following description uses the term "supervisor device" 130, those skilled in the art will appreciate that any references to an IoT manager, group owner, or similar terminology may refer to the supervisor device 130 or another physical or logical component that provides the same or substantially similar functionality.

In one embodiment, the supervisor device 130 may generally observe, monitor, control, or otherwise manage the various other components in the wireless communications system 100B. For example, the supervisor device 130 can communicate with an access network (e.g., access point 125) over air interface 108 and/or a direct wired connection 109 to monitor or manage attributes, activities, or other states associated with the various IoT devices 110-120 in the wireless communications system 100B. The supervisor device 130 may have a wired or wireless connection to the Internet 175 and optionally to the IoT server 170 (shown as a dotted line). The supervisor device 130 may obtain information from the Internet 175 and/or the IoT server 170 that can be used to further monitor or manage attributes, activities, or other states associated with the various IoT devices 110-120. The supervisor device 130 may be a standalone device or one of IoT devices 110-120, such as computer 120. The supervisor device 130 may be a physical device or a software application running on a physical device. The supervisor device 130 may include a user interface that can output information relating to the monitored attributes, activities, or other states associated with the IoT devices 110-120 and receive input information to control or otherwise manage the attributes, activities, or other states associated therewith. Accordingly, the supervisor device 130 may generally include various components and support various wired and wireless communication interfaces to observe, monitor, control, or otherwise manage the various components in the wireless communications system 100B.

The wireless communications system 100B shown in FIG. 1B may include one or more passive IoT devices 105 (in contrast to the active IoT devices 110-120) that can be coupled to or otherwise made part of the wireless communications system 100B. In general, the passive IoT devices 105 may include barcoded devices, Bluetooth devices, radio frequency (RF) devices, RFID tagged devices, infrared (IR) devices, NFC tagged devices, or any other suitable device that can provide its identifier and attributes to another device when queried over a short range interface. Active IoT devices may detect, store, communicate, act on, and/or the like, changes in attributes of passive IoT devices.

For example, passive IoT devices 105 may include a coffee cup and a container of orange juice that each have an RFID tag or barcode. A cabinet IoT device and the refrigerator IoT device 116 may each have an appropriate scanner or reader that can read the RFID tag or barcode to detect when the coffee cup and/or the container of orange juice passive IoT devices 105 have been added or removed. In response to the cabinet IoT device detecting the removal of the coffee cup passive IoT device 105 and the refrigerator IoT device 116 detecting the removal of the container of orange juice passive IoT device, the supervisor device 130 may receive one or more signals that relate to the activities detected at the cabinet IoT device and the refrigerator IoT device 116. The supervisor device 130 may then infer that a user is drinking orange juice from the coffee cup and/or likes to drink orange juice from a coffee cup.

Although the foregoing describes the passive IoT devices 105 as having some form of RFID tag or barcode communication interface, the passive IoT devices 105 may include one or more devices or other physical objects that do not have such communication capabilities. For example, certain IoT devices may have appropriate scanner or reader mechanisms that can detect shapes, sizes, colors, and/or other observable features associated with the passive IoT devices 105 to identify the passive IoT devices 105. In this manner, any suitable physical object may communicate its identity and attributes and become part of the wireless communication system 100B and be observed, monitored, controlled, or otherwise managed with the supervisor device 130. Further, passive IoT devices 105 may be coupled to or otherwise made part of the wireless communications system 100A in FIG. 1A and observed, monitored, controlled, or otherwise managed in a substantially similar manner.

Figure 1C:
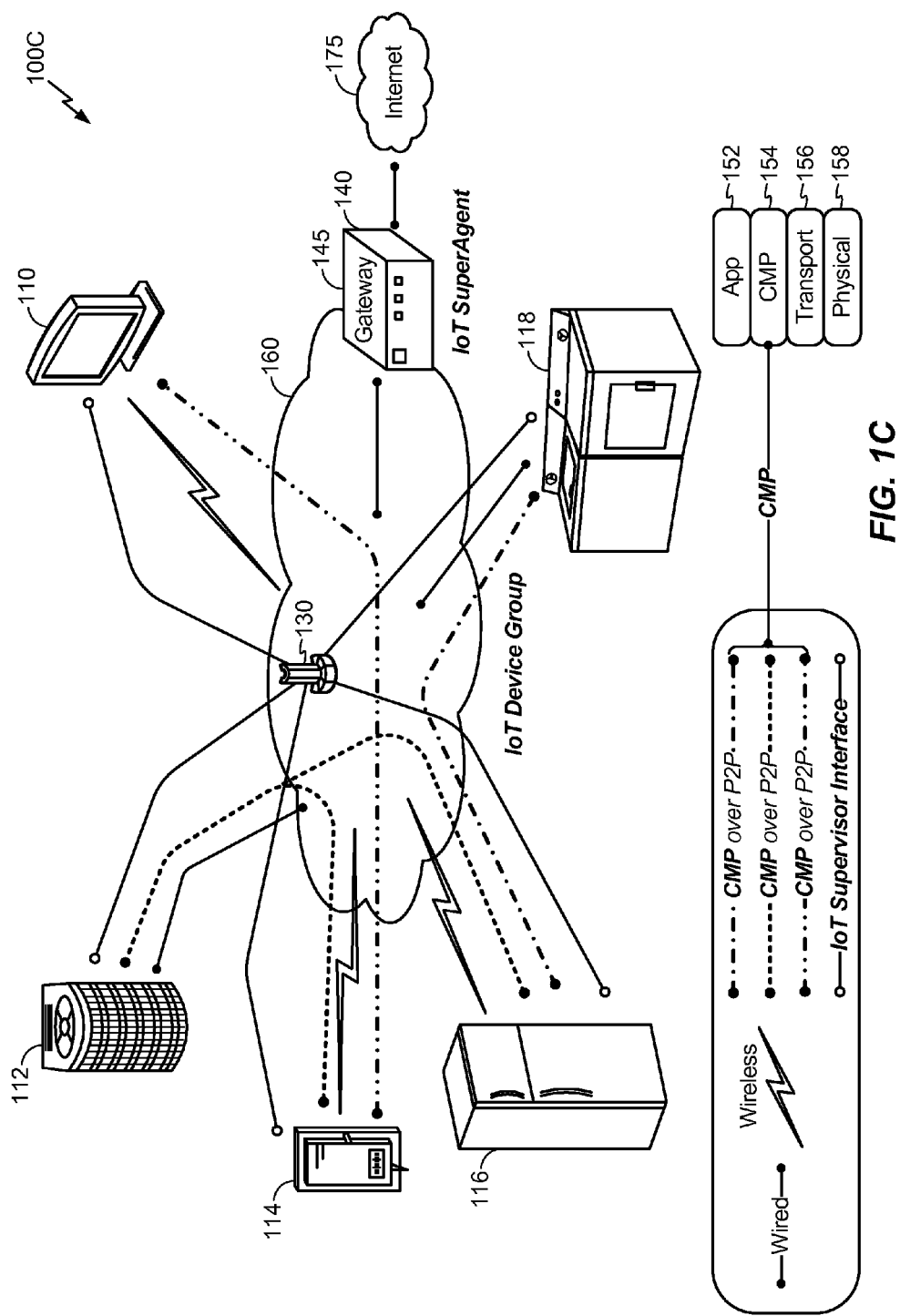
FIG. 1C illustrates a high-level system architecture of a wireless communications system in accordance with an aspect of the disclosure.

In accordance with another aspect of the disclosure, FIG. 1C illustrates a high-level architecture of another wireless communications system 100C that contains a plurality of IoT devices. In general, the wireless communications system 100C shown in FIG. 1C may include various components that are the same and/or substantially similar to the wireless communications systems 100A and 100B shown in FIGS. 1A and 1B, respectively, which were described in greater detail above. As such, for brevity and ease of description, various details relating to certain components in the wireless communications system 100C shown in FIG. 1C may be omitted herein to the extent that the same or similar details have already been provided above in relation to the wireless communications systems 100A and 100B illustrated in FIGS. 1A and 1B, respectively.

The communications system 100C shown in FIG. 1C illustrates exemplary peer-to-peer communications between the IoT devices 110-118 and the supervisor device 130. As shown in FIG. 1C, the supervisor device 130 communicates with each of the IoT devices 110-118 over an IoT supervisor interface. Further, IoT devices 110 and 114, IoT devices 112, 114, and 116, and IoT devices 116 and 118, communicate directly with each other.

The IoT devices 110-118 make up an IoT group 160. An IoT device group 160 is a group of locally connected IoT devices, such as the IoT devices connected to a user's home network. Although not shown, multiple IoT device groups may be connected to and/or communicate with each other via an IoT SuperAgent 140 connected to the Internet 175. At a high level, the supervisor device 130 manages intra-group communications, while the IoT SuperAgent 140 can manage inter-group communications. Although shown as separate devices, the supervisor device 130 and the IoT SuperAgent 140 may be, or reside on, the same device (e.g., a standalone device or an IoT device, such as computer 120 in FIG. 1A). Alternatively, the IoT SuperAgent 140 may correspond to or include the functionality of the access point 125. As yet another alternative, the IoT SuperAgent 140 may correspond to or include the functionality of an IoT server, such as IoT server 170. The IoT SuperAgent 140 may encapsulate gateway functionality 145.

Each IoT device 110-118 can treat the supervisor device 130 as a peer and transmit attribute/schema updates to the supervisor device 130. When an IoT device needs to communicate with another IoT device, it can request the pointer to that IoT device from the supervisor device 130 and then communicate with the target IoT device as a peer. The IoT devices 110-118 communicate with each other over a peer-to-peer communication network using a common messaging protocol (CMP). As long as two IoT devices are CMP-enabled and connected over a common communication transport, they can communicate with each other. In the protocol stack, the CMP layer 154 is below the application layer 152 and above the transport layer 156 and the physical layer 158.

Figure 1D:
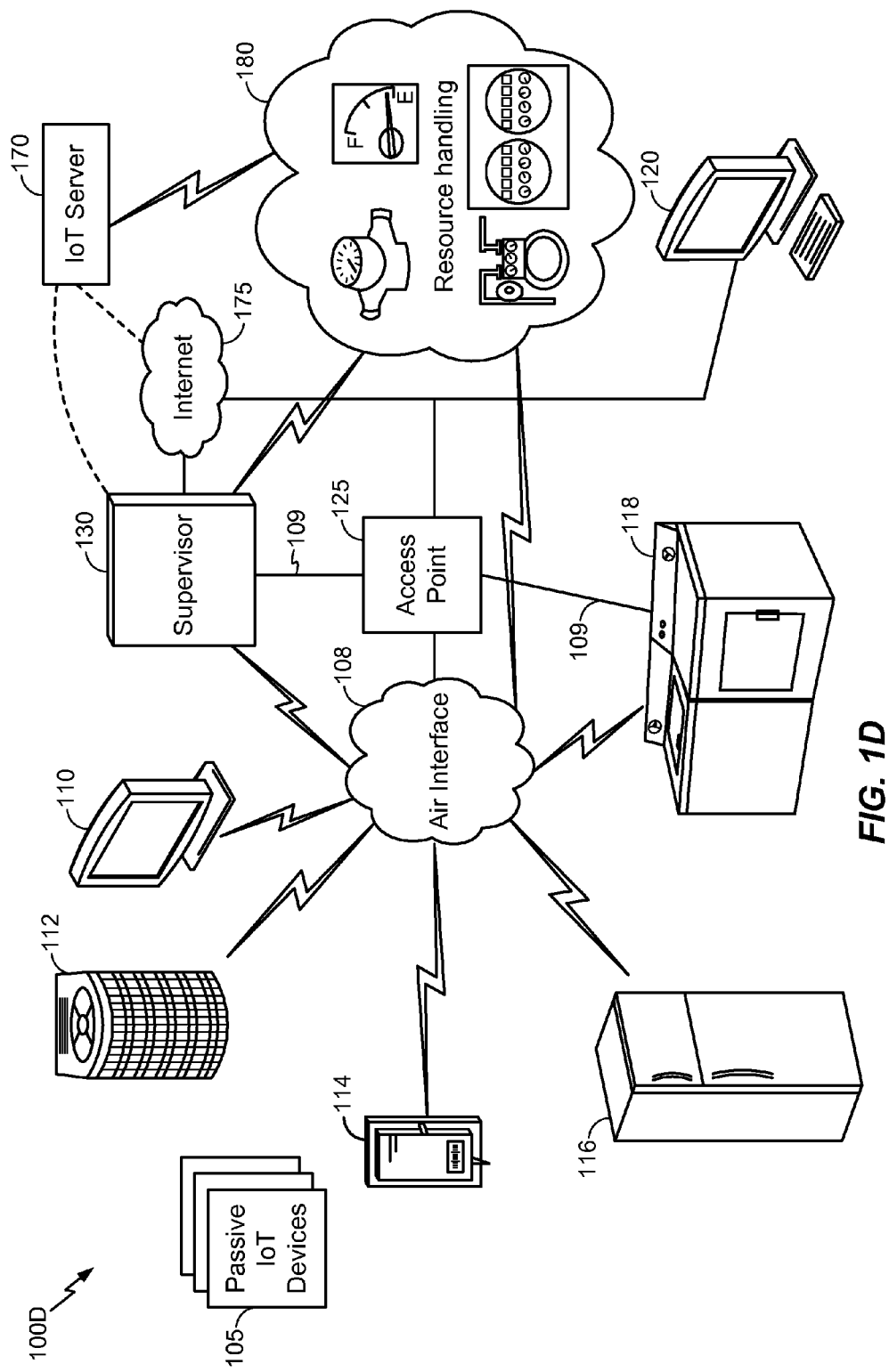
FIG. 1D illustrates a high-level system architecture of a wireless communications system in accordance with an aspect of the disclosure.

In accordance with another aspect of the disclosure, FIG. 1D illustrates a high-level architecture of another wireless communications system 100D that contains a plurality of IoT devices. In general, the wireless communications system 100D shown in FIG. 1D may include various components that are the same and/or substantially similar to the wireless communications systems 100A-C shown in FIGS. 1-C, respectively, which were described in greater detail above. As such, for brevity and ease of description, various details relating to certain components in the wireless communications system 100D shown in FIG. 1D may be omitted herein to the extent that the same or similar details have already been provided above in relation to the wireless communications systems 100A-C illustrated in FIGS. 1A-C, respectively.

The Internet 175 is a "resource" that can be regulated using the concept of the IoT. However, the Internet 175 is just one example of a resource that is regulated, and any resource could be regulated using the concept of the IoT. Other resources that can be regulated include, but are not limited to, electricity, gas, storage, security, and the like. An IoT device may be connected to the resource and thereby regulate it, or the resource could be regulated over the Internet 175. FIG. 1D illustrates several resources 180, such as natural gas, gasoline, hot water, and electricity, wherein the resources 180 can be regulated in addition to and/or over the Internet 175.

IoT devices can communicate with each other to regulate their use of a resource 180. For example, IoT devices such as a toaster, a computer, and a hairdryer may communicate with each other over a Bluetooth communication interface to regulate their use of electricity (the resource 180). As another example, IoT devices such as a desktop computer, a telephone, and a tablet computer may communicate over a Wi-Fi communication interface to regulate their access to the Internet 175 (the resource 180). As yet another example, IoT devices such as a stove, a clothes dryer, and a water heater may communicate over a Wi-Fi communication interface to regulate their use of gas. Alternatively, or additionally, each IoT device may be connected to an IoT server, such as IoT server 170, which has logic to regulate their use of the resource 180 based on information received from the IoT devices.

Figure 1E:
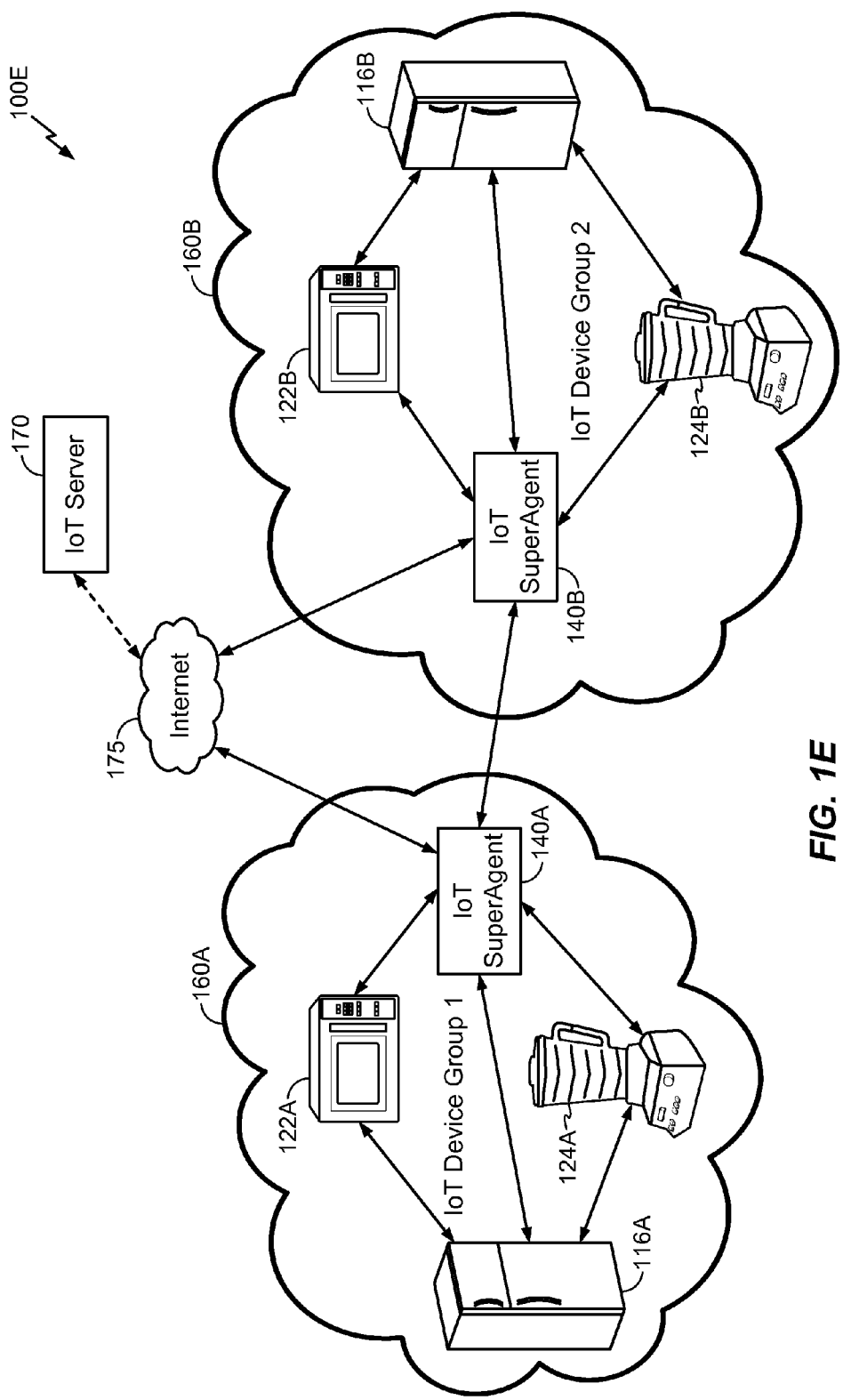
FIG. 1E illustrates a high-level system architecture of a wireless communications system in accordance with an aspect of the disclosure.

In accordance with another aspect of the disclosure, FIG. 1E illustrates a high-level architecture of another wireless communications system 100E that contains a plurality of IoT devices. In general, the wireless communications system 100E shown in FIG. 1E may include various components that are the same and/or substantially similar to the wireless communications systems 100A-D shown in FIGS. 1-D, respectively, which were described in greater detail above. As such, for brevity and ease of description, various details relating to certain components in the wireless communications system 100E shown in FIG. 1E may be omitted herein to the extent that the same or similar details have already been provided above in relation to the wireless communications systems 100A-D illustrated in FIGS. 1A-D, respectively.

The communications system 100E includes two IoT device groups 160A and 160B. Multiple IoT device groups may be connected to and/or communicate with each other via an IoT SuperAgent connected to the Internet 175. At a high level, an IoT SuperAgent may manage inter-group communications among IoT device groups. For example, in FIG. 1E, the IoT device group 160A includes IoT devices 116A, 122A, and 124A and an IoT SuperAgent 140A, while IoT device group 160B includes IoT devices 116B, 122B, and 124B and an IoT SuperAgent 140B. As such, the IoT SuperAgents 140A and 140B may connect to the Internet 175 and communicate with each other over the Internet 175 and/or communicate with each other directly to facilitate communication between the IoT device groups 160A and 160B. Furthermore, although FIG. 1E illustrates two IoT device groups 160A and 160B communicating with each other via IoT SuperAgents 140A and 140B, those skilled in the art will appreciate that any number of IoT device groups may suitably communicate with each other using IoT SuperAgents.

Figure 2A:
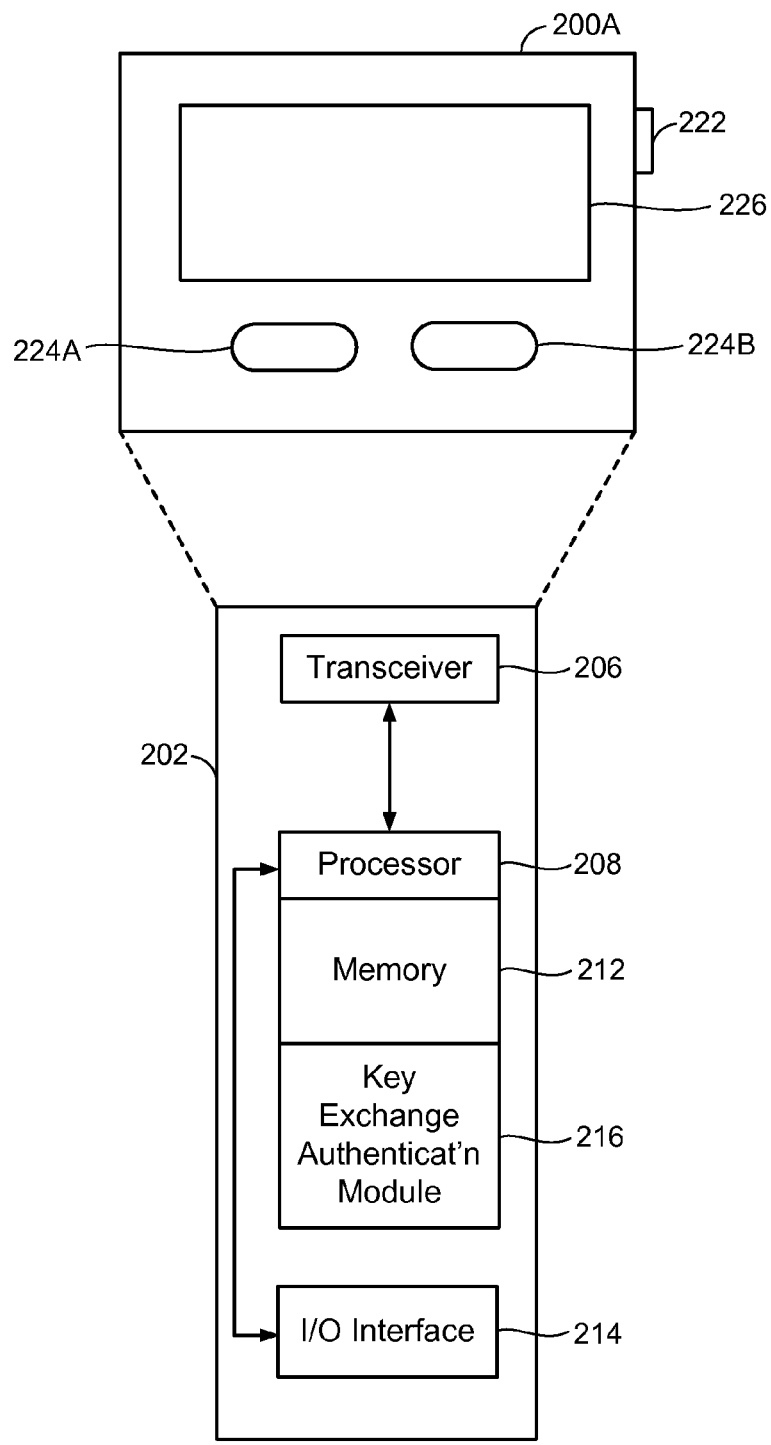

FIG. 2A illustrates a high-level example of an IoT device 200A in accordance with aspects of the disclosure. While external appearances and/or internal components can differ significantly among IoT devices, most IoT devices will have some sort of user interface, which may comprise a display and a means for user input. IoT devices without a user interface can be communicated with remotely over a wired or wireless network, such as air interface 108 in FIGS. 1A-B.

As shown in FIG. 2A, in an example configuration for the IoT device 200A, an external casing of IoT device 200A may be configured with a display 226, a power button 222, and two control buttons 224A and 224B, among other components, as is known in the art. The display 226 may be a touchscreen display, in which case the control buttons 224A and 224B may not be necessary. While not shown explicitly as part of IoT device 200A, the IoT device 200A may include one or more external antennas and/or one or more integrated antennas that are built into the external casing, including but not limited to Wi-Fi antennas, cellular antennas, satellite position system (SPS) antennas (e.g., global positioning system (GPS) antennas), and so on.

While internal components of IoT devices, such as IoT device 200A, can be embodied with different hardware configurations, a basic high-level configuration for internal hardware components is shown as platform 202 in FIG. 2A. The platform 202 can receive and execute software applications, data and/or commands transmitted over a network interface, such as air interface 108 in FIGS. 1A-B and/or a wired interface. The platform 202 can also independently execute locally stored applications. The platform 202 can include one or more transceivers 206 configured for wired and/or wireless communication (e.g., a Wi-Fi transceiver, a Bluetooth transceiver, a cellular transceiver, a satellite transceiver, a GPS or SPS receiver, etc.) operably coupled to one or more processors 208, such as a microcontroller, microprocessor, application specific integrated circuit, digital signal processor (DSP), programmable logic circuit, or other data processing device, which will be generally referred to as processor 208. The processor 208 can execute application programming instructions within a memory 212 of the IoT device. The memory 212 can include one or more of read-only memory (ROM), random-access memory (RAM), electrically erasable programmable ROM (EEPROM), flash cards, or any memory common to computer platforms. One or more input/output (I/O) interfaces 214 can be configured to allow the processor 208 to communicate with and control from various I/O devices such as the display 226, power button 222, control buttons 224A and 224B as illustrated, and any other devices, such as sensors, actuators, relays, valves, switches, and the like associated with the IoT device 200A. The platform 202 may further include a key exchange authentication module 216, which may be an executable module stored in memory 212 or a hardware/firmware module incorporated into or coupled to processor 208.

Accordingly, an aspect of the disclosure can include an IoT device (e.g., IoT device 200A) including the ability to perform the functions described herein. As will be appreciated by those skilled in the art, the various logic elements can be embodied in discrete elements, software modules executed on a processor (e.g., processor 208) or any combination of software and hardware to achieve the functionality disclosed herein. For example, transceiver 206, processor 208, memory 212, I/O interface 214, and/or the key exchange authentication module 216 may all be used cooperatively to load, store and execute the various functions disclosed herein and thus the logic to perform these functions may be distributed over various elements. Alternatively, the functionality could be incorporated into one discrete component, such as the key exchange authentication module 216. Therefore, the features of the IoT device 200A in FIG. 2A are to be considered merely illustrative and the disclosure is not limited to the illustrated features or arrangement.

For example, where the IoT device 200A is a first peer device configured to authenticate a key exchange between itself and a second peer device, the transceiver 206, the processor 208, the key exchange authentication module 216, and optionally the I/O interface 214, may cooperatively send federated login credentials of a user of the IoT device 200A and a first identifier to a first federated login provider, wherein the second peer device sends the federated login credentials of the user and a second identifier to a second federated login provider, receive a first authentication response from the first federated login provider, wherein the second peer device receives a second authentication response from the second federated login provider, receive the second authentication response from the second peer device, authenticate the second authentication response with the second federated login provider, send the first authentication response to the second peer device, wherein the second peer device authenticates the first authentication response with the first federated login provider, receive an acknowledgment from the second peer device indicating that the second peer device has authenticated the first authentication response, send an acknowledgment to the second peer device indicating that the IoT device 200A has authenticated the second authentication response, and authenticate the key exchange based on the acknowledgment from the second peer device, wherein the second peer device authenticates the key exchange based on the acknowledgment from the IoT device 200A, as described herein. In this scenario, the IoT device 200A may be a controller or a controllee device, as described further herein.

Figure 2B:
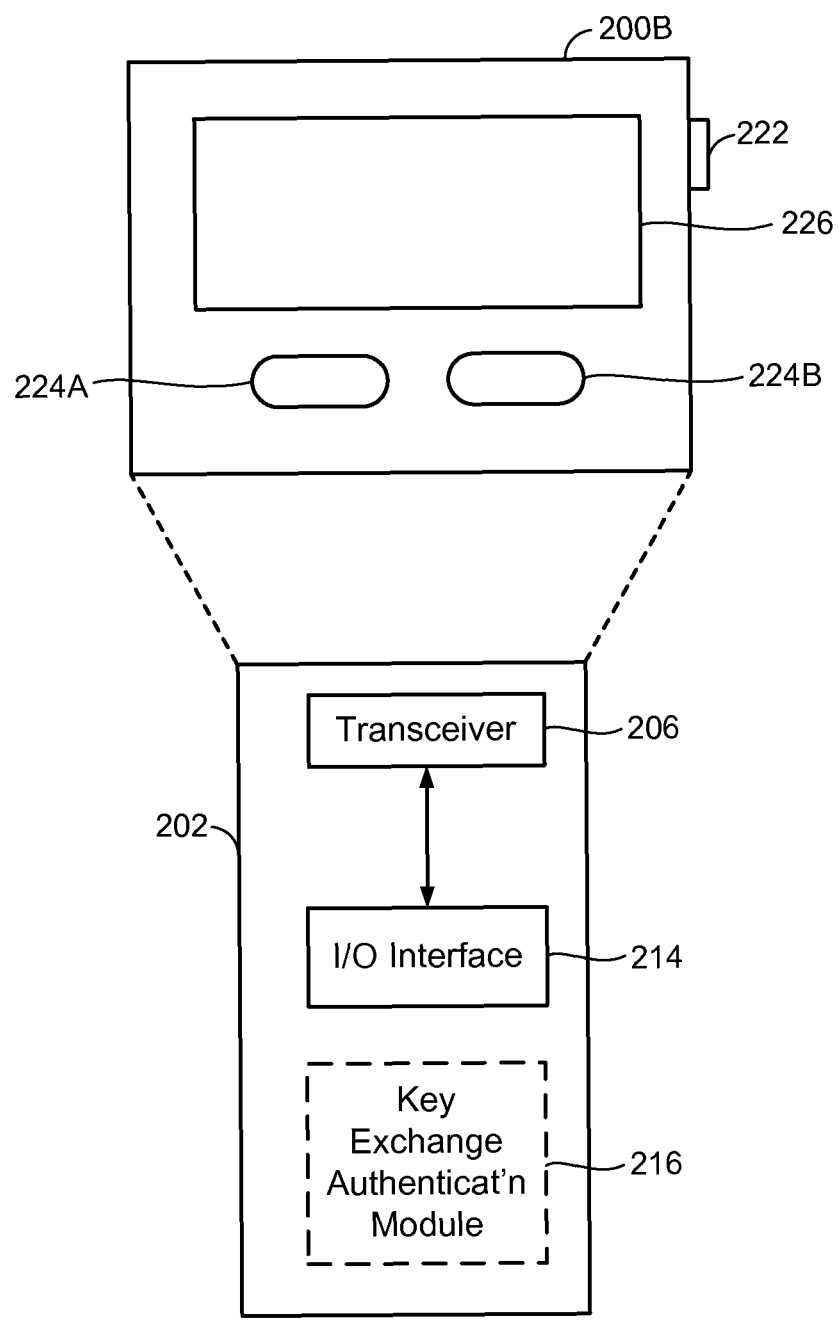
FIG. 2B illustrates an exemplary passive IoT device in accordance with aspects of the disclosure.

FIG. 2B illustrates a high-level example of a passive IoT device 200B in accordance with aspects of the disclosure. In general, the passive IoT device 200B shown in FIG. 2B may include various components that are the same and/or substantially similar to the IoT device 200A shown in FIG. 2A, which was described in greater detail above. As such, for brevity and ease of description, various details relating to certain components in the passive IoT device 200B shown in FIG. 2B may be omitted herein to the extent that the same or similar details have already been provided above in relation to the IoT device 200A illustrated in FIG. 2A.

The passive IoT device 200B shown in FIG. 2B may generally differ from the IoT device 200A shown in FIG. 2A in that the passive IoT device 200B may not have a processor, internal memory, or certain other components. Instead, in one embodiment, the passive IoT device 200B may only include an I/O interface 214 or other suitable mechanism that allows the passive IoT device 200B to be observed, monitored, controlled, managed, or otherwise known within a controlled IoT network. For example, in one embodiment, the I/O interface 214 associated with the passive IoT device 200B may include a barcode, Bluetooth interface, radio frequency (RF) interface, RFID tag, IR interface, NFC interface, or any other suitable I/O interface that can provide an identifier and attributes associated with the passive IoT device 200B to another device when queried over a short range interface (e.g., an active IoT device, such as IoT device 200A, that can detect, store, communicate, act on, or otherwise process information relating to the attributes associated with the passive IoT device 200B).

In an aspect, where the IoT device 200B is a first peer device configured to authenticate a key exchange between itself and a second peer device, the transceiver 206, the key exchange authentication module 216, and optionally the I/O interface 214, may cooperatively send federated login credentials of a user of the IoT device 200B and a first identifier to a first federated login provider, wherein the second peer device sends the federated login credentials of the user and a second identifier to a second federated login provider, receive a first authentication response from the first federated login provider, wherein the second peer device receives a second authentication response from the second federated login provider, receive the second authentication response from the second peer device, authenticate the second authentication response with the second federated login provider, send the first authentication response to the second peer device, wherein the second peer device authenticates the first authentication response with the first federated login provider, receive an acknowledgment from the second peer device indicating that the second peer device has authenticated the first authentication response, send an acknowledgment to the second peer device indicating that the IoT device 200A has authenticated the second authentication response, and authenticate the key exchange based on the acknowledgment from the second peer device, wherein the second peer device authenticates the key exchange based on the acknowledgment from the IoT device 200B, as described herein. In this scenario, the IoT device 200B may be a controllee device, as described further herein. The key exchange authentication module 216 is illustrated as being optional because not every passive IoT device may include a key exchange authentication module 216.

Although the foregoing describes the passive IoT device 200B as having some form of RF, barcode, or other I/O interface 214, the passive IoT device 200B may comprise a device or other physical object that does not have such an I/O interface 214. For example, certain IoT devices may have appropriate scanner or reader mechanisms that can detect shapes, sizes, colors, and/or other observable features associated with the passive IoT device 200B to identify the passive IoT device 200B. In this manner, any suitable physical object may communicate its identity and attributes and be observed, monitored, controlled, or otherwise managed within a controlled IoT network.

Figure 3:
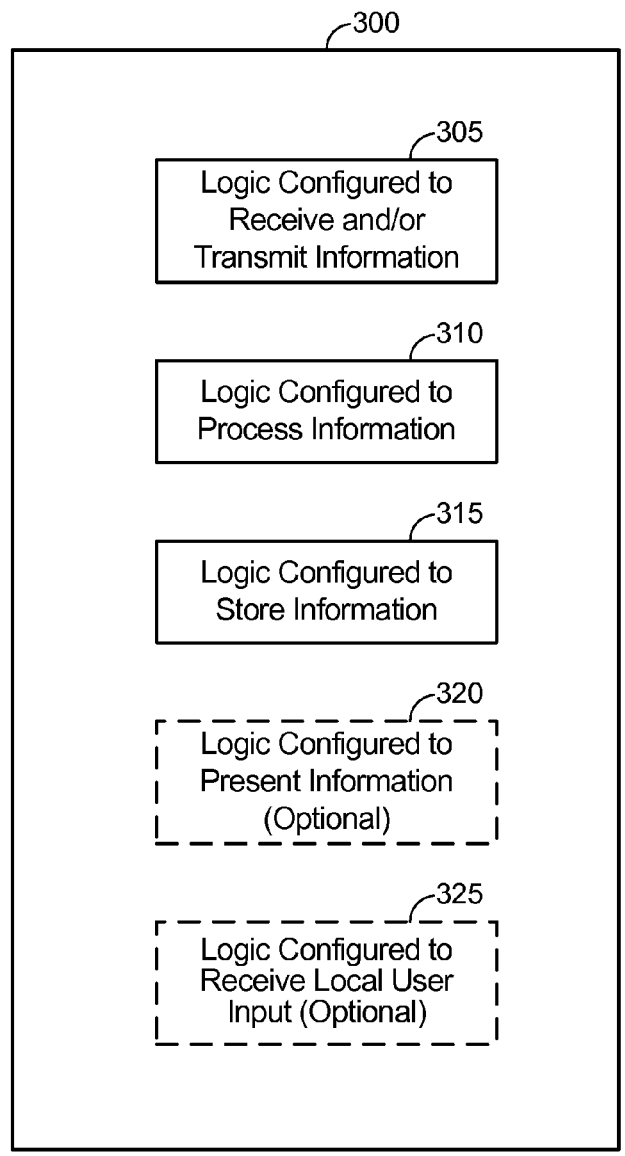
FIG. 3 illustrates a communication device that includes logic configured to perform functionality in accordance with an aspect of the disclosure.

FIG. 3 illustrates a communication device 300 that includes logic configured to perform functionality. The communication device 300 can correspond to any of the above-noted communication devices, including but not limited to IoT devices 110-120, IoT device 200A, any components coupled to the Internet 175 (e.g., the IoT server 170), and so on. Thus, communication device 300 can correspond to any electronic device that is configured to communicate with (or facilitate communication with) one or more other entities over the wireless communications systems 100A-B of FIGS. 1A-B.

Referring to FIG. 3, the communication device 300 includes logic configured to receive and/or transmit information 305. In an example, if the communication device 300 corresponds to a wireless communications device (e.g., IoT device 200A and/or passive IoT device 200B), the logic configured to receive and/or transmit information 305 can include a wireless communications interface (e.g., Bluetooth, Wi-Fi, Wi-Fi Direct, Long-Term Evolution (LTE) Direct, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., the application 170), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the processor included in the logic configured to process information 310 can correspond to a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM, flash memory, ROM, erasable programmable ROM (EPROM), EEPROM, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

In an aspect, where the communication device 300 is a first peer device configured to authenticate a key exchange between itself and a second peer device, the logic configured to receive and/or send information 305, the logic configured to process information 310, and the logic configured to store information 315 may cooperatively send federated login credentials of a user of the communication device 300 and a first identifier to a first federated login provider, wherein the second peer device sends the federated login credentials of the user and a second identifier to a second federated login provider, receive a first authentication response from the first federated login provider, wherein the second peer device receives a second authentication response from the second federated login provider, receive the second authentication response from the second peer device, authenticate the second authentication response with the second federated login provider, send the first authentication response to the second peer device, wherein the second peer device authenticates the first authentication response with the first federated login provider, receive an acknowledgment from the second peer device indicating that the second peer device has authenticated the first authentication response, send an acknowledgment to the second peer device indicating that the communication device 300 has authenticated the second authentication response, and authenticate the key exchange based on the acknowledgment from the second peer device, wherein the second peer device authenticates the key exchange based on the acknowledgment from the communication device 300, as described herein. In this scenario, the communication device 300 may be a controller or a controllee device, as described further herein.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to the IoT device 200A as shown in FIG. 2A and/or the passive IoT device 200B as shown in FIG. 2B, the logic configured to present information 320 can include the display 226. In a further example, the logic configured to present information 320 can be omitted for certain communication devices, such as network communication devices that do not have a local user (e.g., network switches or routers, remote servers, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to the IoT device 200A as shown in FIG. 2A and/or the passive IoT device 200B as shown in FIG. 2B, the logic configured to receive local user input 325 can include the buttons 222, 224A, and 224B, the display 226 (if a touchscreen), etc. In a further example, the logic configured to receive local user input 325 can be omitted for certain communication devices, such as network communication devices that do not have a local user (e.g., network switches or routers, remote servers, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 4:
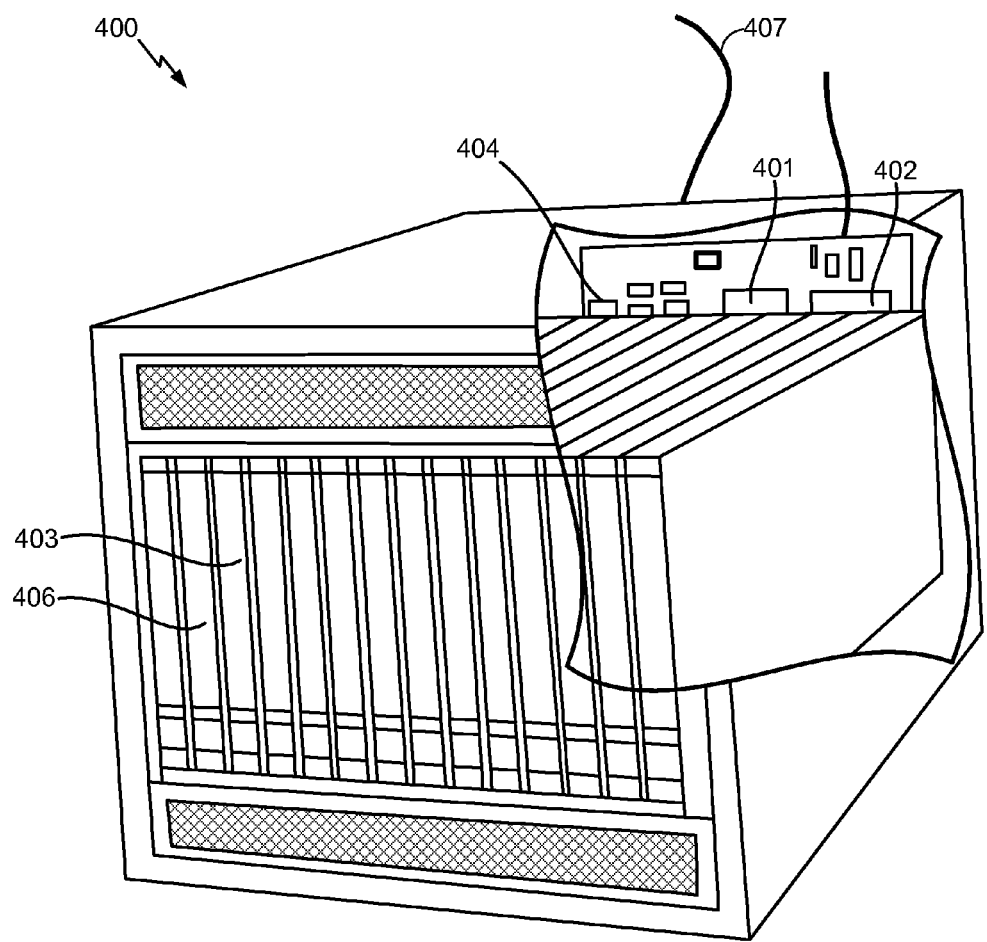
FIG. 4 illustrates an exemplary server according to various aspects of the disclosure.

The various embodiments may be implemented on any of a variety of commercially available server devices, such as server 400 illustrated in FIG. 4. In an example, the server 400 may correspond to one example configuration of the IoT server 170 described above or an OpenID/OAuth/FaceConnect provider as described further herein. In FIG. 4, the server 400 includes a processor 401 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet. In context with FIG. 3, it will be appreciated that the server 400 of FIG. 4 illustrates one example implementation of the communication device 300, whereby the logic configured to transmit and/or receive information 305 corresponds to the network access points 404 used by the server 400 to communicate with the network 407, the logic configured to process information 310 corresponds to the processor 401, and the logic configuration to store information 315 corresponds to any combination of the volatile memory 402, the disk drive 403 and/or the disc drive 406. The optional logic configured to present information 320 and the optional logic configured to receive local user input 325 are not shown explicitly in FIG. 4 and may or may not be included therein. Thus, FIG. 4 helps to demonstrate that the communication device 300 may be implemented as a server, in addition to an IoT device implementation as in FIG. 2A.

Figure 5:
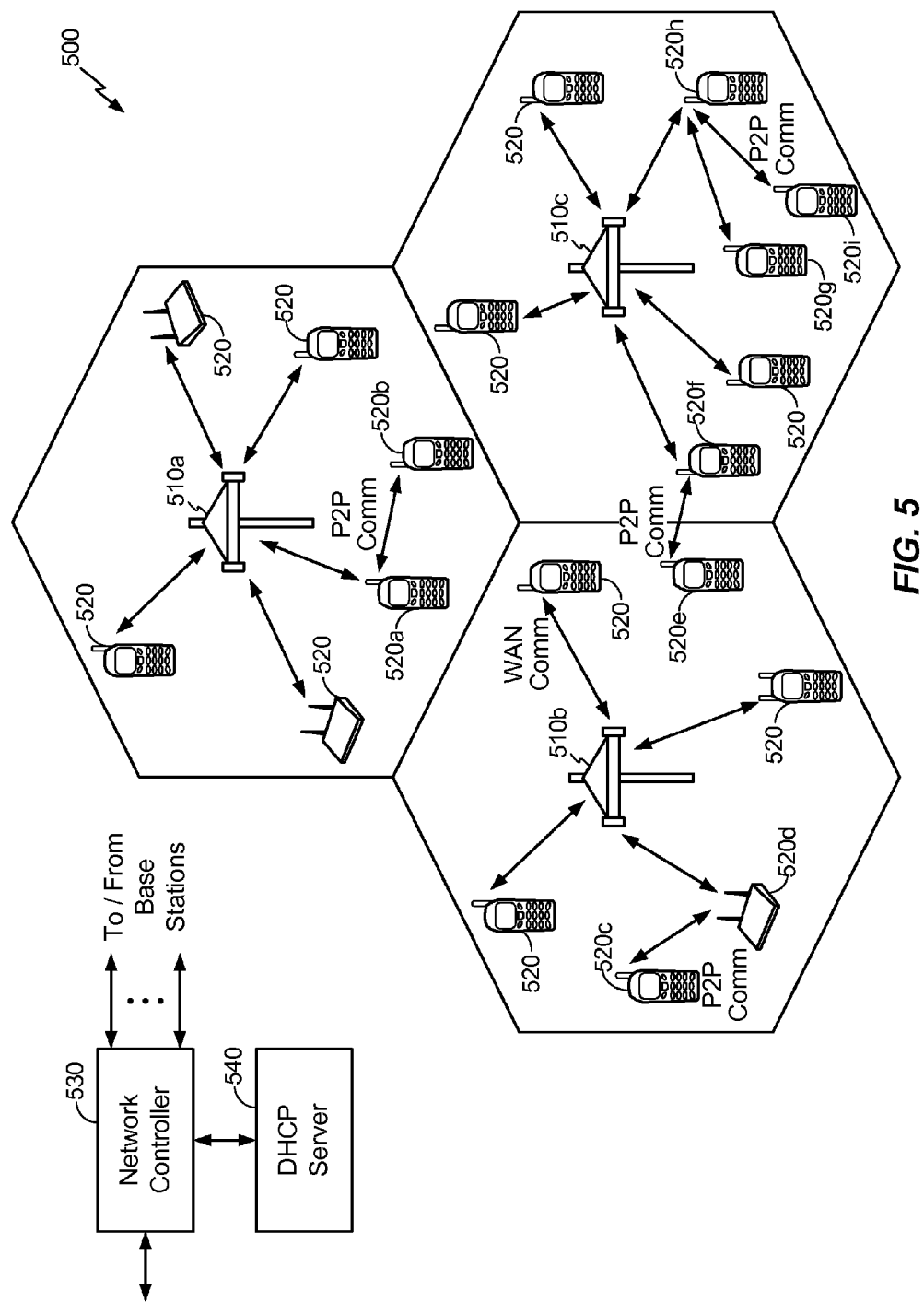
FIG. 5 illustrates a wireless communication network that may support discoverable peer-to-peer (P2P) services, in accordance with one aspect of the disclosure.

In general, user equipment (UE) such as telephones, tablet computers, laptop and desktop computers, certain vehicles, etc., can be configured to connect with each other either locally (e.g., Bluetooth, local Wi-Fi, etc.) or remotely (e.g., via cellular networks, through the Internet, etc.). Furthermore, certain UEs may also support proximity-based peer-to-peer (P2P) communication using certain wireless networking technologies (e.g., Wi-Fi, Bluetooth, Wi-Fi Direct, etc.) that enable devices to make a one-to-one connection or simultaneously connect to a group that includes several devices in order to directly communicate with one another. To that end, FIG. 5 illustrates an exemplary wireless communication network or WAN 500 that may support discoverable P2P services. For example, in one embodiment, the wireless communication network 500 may comprise an LTE network or another suitable WAN that includes various base stations 510 and other network entities. For simplicity, only three base stations 510a, 510b and 510c, one network controller 530, and one Dynamic Host Configuration Protocol (DHCP) server 540 are shown in FIG. 5. A base station 510 may be an entity that communicates with devices 520 and may also be referred to as a Node B, an evolved Node B (eNB), an access point, etc. Each base station 510 may provide communication coverage for a particular geographic area and may support communication for the devices 520 located within the coverage area. To improve network capacity, the overall coverage area of a base station 510 may be partitioned into multiple (e.g., three) smaller areas, wherein each smaller area may be served by a respective base station 510. In 3GPP, the term "cell" can refer to a coverage area of a base station 510 and/or a base station subsystem 510 serving this coverage area, depending on the context in which the term is used. In 3GPP2, the term "sector" or "cell-sector" can refer to a coverage area of a base station 510 and/or a base station subsystem 510 serving this coverage area. For clarity, the 3GPP concept of "cell" may be used in the description herein.

A base station 510 may provide communication coverage for a macro cell, a pico cell, a femto cell, and/or other cell types. A macro cell may cover a relatively large geographic area (e.g., several kilometers in radius) and may allow unrestricted access by devices 520 with service subscription. A pico cell may cover a relatively small geographic area and may allow unrestricted access by devices 520 with service subscription. A femto cell may cover a relatively small geographic area (e.g., a home) and may allow restricted access by devices 520 having association with the femto cell (e.g., devices 520 in a Closed Subscriber Group (CSG)). In the example shown in FIG. 5, wireless network 500 includes macro base stations 510a, 510b and 510c for macro cells. Wireless network 500 may also include pico base stations 510 for pico cells and/or home base stations 510 for femto cells (not shown in FIG. 5).

Network controller 530 may couple to a set of base stations 510 and may provide coordination and control for these base stations 510. Network controller 530 may be a single network entity or a collection of network entities that can communicate with the base stations via a backhaul. The base stations may also communicate with one another, e.g., directly or indirectly via wireless or wireline backhaul. DHCP server 540 may support P2P communication, as described below. DHCP server 540 may be part of wireless network 500, external to wireless network 500, run via Internet Connection Sharing (ICS), or any suitable combination thereof. DHCP server 540 may be a separate entity (e.g., as shown in FIG. 5) or may be part of a base station 510, network controller 530, or some other entity. In any case, DHCP server 540 may be reachable by devices 520 desiring to communicate peer-to-peer.

Devices 520 may be dispersed throughout wireless network 500, and each device 520 may be stationary or mobile. A device 520 may also be referred to as a node, user equipment (UE), a station, a mobile station, a terminal, an access terminal, a subscriber unit, etc. A device 520 may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, etc. A device 520 may communicate with base stations 510 in the wireless network 500 and may further communicate peer-to-peer with other devices 520. For example, as shown in FIG. 5, devices 520a and 520b may communicate peer-to-peer, devices 520c and 520d may communicate peer-to-peer, devices 520e and 520f may communicate peer-to-peer, and devices 520g, 520h, and 520i may communicate peer-to-peer, while remaining devices 520 may communicate with base stations 510. As further shown in FIG. 5, devices 520a, 520d, 520f, and 520h may also communicate with base stations 500, e.g., when not engaged in P2P communication or possibly concurrent with P2P communication.

In the description herein, WAN communication may refer to communication between a device 520 and a base station 510 in wireless network 500, e.g., for a call with a remote entity such as another device 520. A WAN device is a device 520 that is interested or engaged in WAN communication. P2P communication refers to direct communication between two or more devices 520, without going through any base station 510. A P2P device is a device 520 that is interested or engaged in P2P communication, e.g., a device 520 that has traffic data for another device 520 within proximity of the P2P device. Two devices may be considered to be within proximity of one another, for example, if each device 520 can detect the other device 520. In general, a device 520 may communicate with another device 520 either directly for P2P communication or via at least one base station 510 for WAN communication.

In one embodiment, direct communication between P2P devices 520 may be organized into P2P groups. More particularly, a P2P group generally refers to a group of two or more devices 520 interested or engaged in P2P communication and a P2P link refers to a communication link for a P2P group. Furthermore, in one embodiment, a P2P group may include one device 520 designated a P2P group owner (or a P2P server) and one or more devices 520 designated P2P clients that are served by the P2P group owner. The P2P group owner may perform certain management functions such as exchanging signaling with a WAN, coordinating data transmission between the P2P group owner and P2P clients, etc. For example, as shown in FIG. 5, a first P2P group includes devices 520a and 520b under the coverage of base station 510a, a second P2P group includes devices 520c and 520d under the coverage of base station 510b, a third P2P group includes devices 520e and 520f under the coverage of different base stations 510b and 510c, and a fourth P2P group includes devices 520g, 520h hand 520i under the coverage of base station 510c. Devices 520a, 520d, 520f, and 520h may be P2P group owners for their respective P2P groups and devices 520b, 520c, 520e, 520g, and 520i may be P2P clients in their respective P2P groups. The other devices 520 in FIG. 5 may be engaged in WAN communication.

In one embodiment, P2P communication may occur only within a P2P group and may further occur only between the P2P group owner and the P2P clients associated therewith. For example, if two P2P clients within the same P2P group (e.g., devices 520g and 520i) desire to exchange information, one of the P2P clients may send the information to the P2P group owner (e.g., device 520h) and the P2P group owner may then relay transmissions to the other P2P client.

In one embodiment, a particular device 520 may belong to multiple P2P groups and may behave as either a P2P group owner or a P2P client in each P2P group. Furthermore, in one embodiment, a particular P2P client may belong to only one P2P group or belong to multiple P2P group and communicate with P2P devices 520 in any of the multiple P2P groups at any particular moment. In general, communication may be facilitated via transmissions on the downlink and uplink. For WAN communication, the downlink (or forward link) refers to the communication link from base stations 510 to devices 520, and the uplink (or reverse link) refers to the communication link from devices 520 to base stations 510. For P2P communication, the P2P downlink refers to the communication link from P2P group owners to P2P clients and the P2P uplink refers to the communication link from P2P clients to P2P group owners. In certain embodiments, rather than using WAN technologies to communicate P2P, two or more devices may form smaller P2P groups and communicate P2P on a wireless local area network (WLAN) using technologies such as Wi-Fi, Bluetooth, or Wi-Fi Direct. For example, P2P communication using Wi-Fi, Bluetooth, Wi-Fi Direct, or other WLAN technologies may enable P2P communication between two or more mobile phones, game consoles, laptop computers, or other suitable communication entities.

Figure 6:
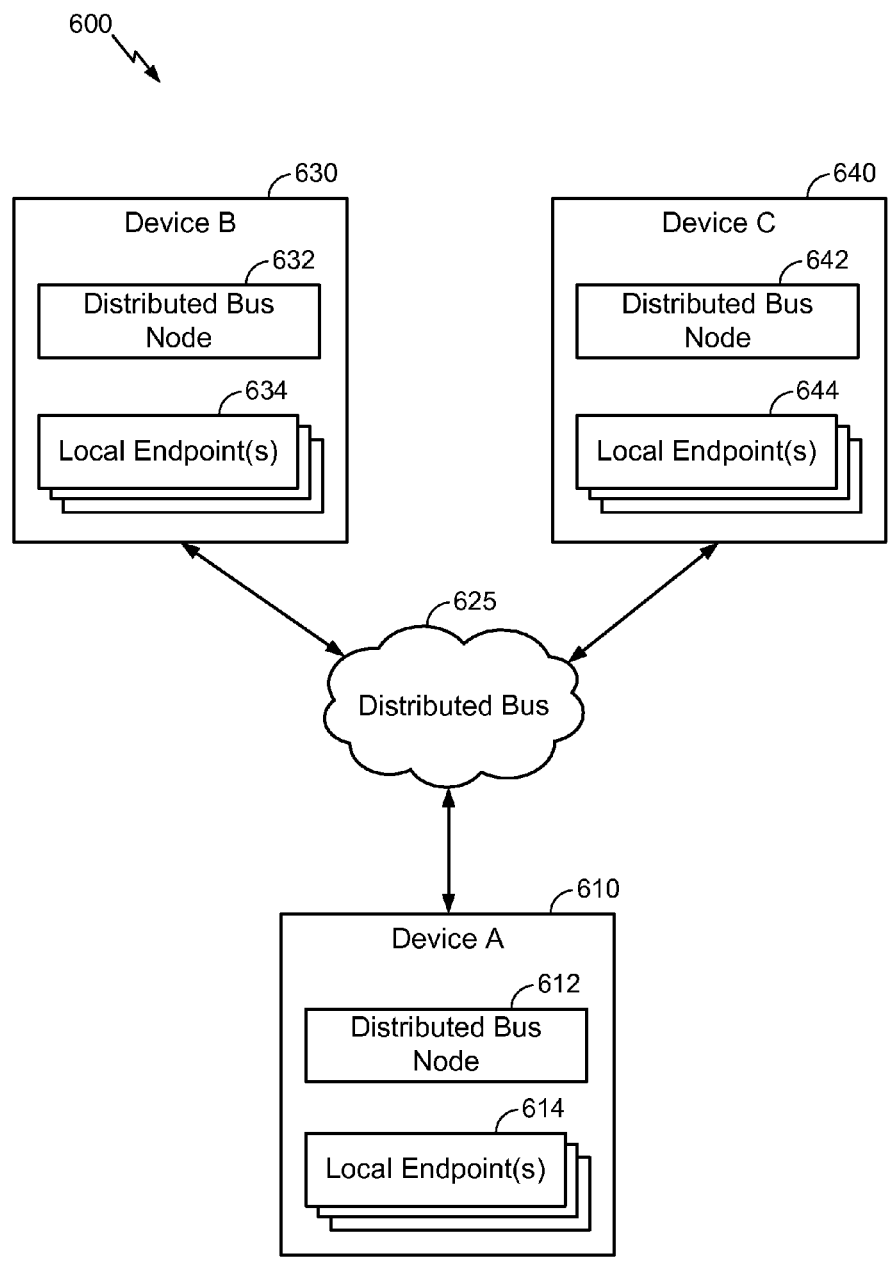
FIG. 6 illustrates an exemplary environment in which discoverable P2P services may be used to establish a proximity-based distributed bus over which various devices may communicate, in accordance with one aspect of the disclosure.

According to one aspect of the disclosure, FIG. 6 illustrates an exemplary environment 600 in which discoverable P2P services may be used to establish a proximity-based distributed bus over which various devices 610, 630, 640 may communicate. For example, in one embodiment, communications between applications and the like, on a single platform may be facilitated using an interprocess communication protocol (IPC) framework over the distributed bus 625, which may comprise a software bus used to enable application-to-application communications in a networked computing environment where applications register with the distributed bus 625 to offer services to other applications and other applications query the distributed bus 625 for information about registered applications. Such a protocol may provide asynchronous notifications and remote procedure calls (RPCs) in which signal messages (e.g., notifications) may be point-to-point or broadcast, method call messages (e.g., RPCs) may be synchronous or asynchronous, and the distributed bus 625 (e.g., a "daemon" bus process) may handle message routing between the various devices 610, 630, 640.

In one embodiment, the distributed bus 625 may be supported by a variety of transport protocols (e.g., Bluetooth, TCP/IP, Wi-Fi, CDMA, GPRS, UMTS, etc.). For example, according to one aspect, a first device 610 may include a distributed bus node 612 and one or more local endpoints 614, wherein the distributed bus node 612 may facilitate communications between local endpoints 614 associated with the first device 610 and local endpoints 634 and 644 associated with a second device 630 and a third device 640 through the distributed bus 625 (e.g., via distributed bus nodes 632 and 642 on the second device 630 and the third device 640). As will be described in further detail below with reference to FIG. 7, the distributed bus 625 may support symmetric multi-device network topologies and may provide a robust operation in the presence of device drops-outs. As such, the virtual distributed bus 625, which may generally be independent from any underlying transport protocol (e.g., Bluetooth, TCP/IP, Wi-Fi, etc.) may allow various security options, from unsecured (e.g., open) to secured (e.g., authenticated and encrypted), wherein the security options can be used while facilitating spontaneous connections with among the first device 610, the second device 630, and the third device 640 without intervention when the various devices 610, 630, 640 come into range or proximity to each other.

Figure 7:
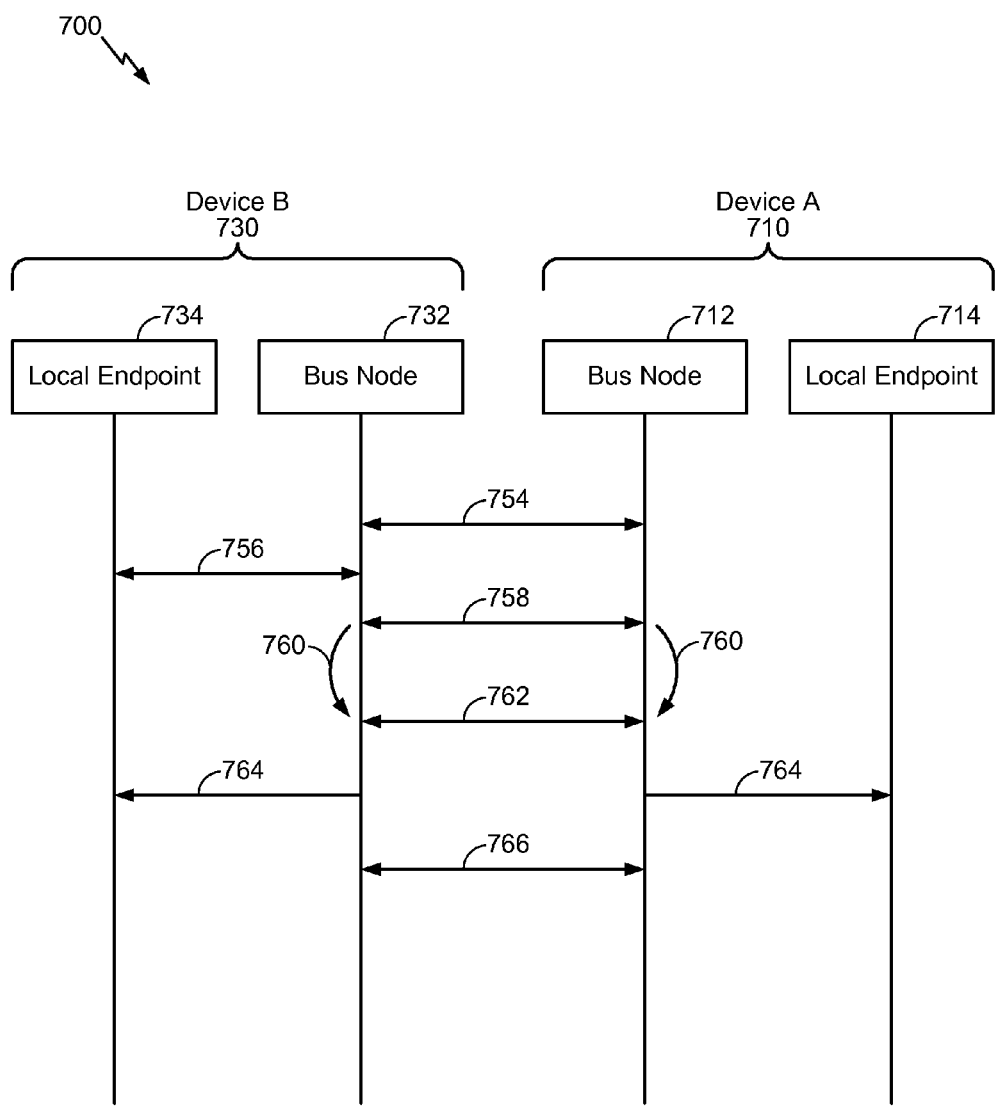
FIG. 7 illustrates an exemplary message sequence in which discoverable P2P services may be used to establish a proximity-based distributed bus over which various devices may communicate, in accordance with one aspect of the disclosure.

According to one aspect of the disclosure, FIG. 7 illustrates an exemplary message sequence 700 in which discoverable P2P services may be used to establish a proximity-based distributed bus over which a first device ("Device A") 710 and a second device ("Device B") 730 may communicate. Generally, Device A 710 may request to communicate with Device B 730, wherein Device A 710 may a include local endpoint 714 (e.g., a local application, service, etc.), which may make a request to communicate in addition to a bus node 712 that may assist in facilitating such communications. Further, Device B 730 may include a local endpoint 734 with which the local endpoint 714 may be attempting to communicate in addition to a bus node 732 that may assist in facilitating communications between the local endpoint 714 on the Device A 710 and the local endpoint 734 on Device B 730.

In one embodiment, the bus nodes 712 and 732 may perform a suitable discovery mechanism at message sequence step 754. For example, mechanisms for discovering connections supported by Bluetooth, TCP/IP, UNIX, or the like may be used. At message sequence step 756, the local endpoint 714 on Device A 710 may request to connect to an entity, service, endpoint etc, available through bus node 712. In one embodiment, the request may include a request-and-response process between local endpoint 714 and bus node 712. At message sequence step 758, a distributed message bus may be formed to connect bus node 712 to bus node 732 and thereby establish a P2P connection between Device A 710 and Device B 730. In one embodiment, communications to form the distributed bus between the bus nodes 712 and 732 may be facilitated using a suitable proximity-based P2P protocol (e.g., the AllJoyn™ software framework designed to enable interoperability among connected products and software applications from different manufacturers to dynamically create proximal networks and facilitate proximal P2P communication). Alternatively, in one embodiment, a server (not shown) may facilitate the connection between the bus nodes 712 and 732. Furthermore, in one embodiment, a suitable authentication mechanism may be used prior to forming the connection between bus nodes 712 and 732 (e.g., SASL authentication in which a client may send an authentication command to initiate an authentication conversation). Still further, during message sequence step 758, bus nodes 712 and 732 may exchange information about other available endpoints (e.g., local endpoints 644 on Device C 640 in FIG. 6). In such embodiments, each local endpoint that a bus node maintains may be advertised to other bus nodes, wherein the advertisement may include unique endpoint names, transport types, connection parameters, or other suitable information.

In one embodiment, at message sequence step 760, bus node 712 and bus node 732 may use obtained information associated with the local endpoints 734 and 714, respectively, to create virtual endpoints that may represent the real obtained endpoints available through various bus nodes. In one embodiment, message routing on the bus node 712 may use real and virtual endpoints to deliver messages. Further, there may one local virtual endpoint for every endpoint that exists on remote devices (e.g., Device A 710). Still further, such virtual endpoints may multiplex and/or de-multiplex messages sent over the distributed bus (e.g., a connection between bus node 712 and bus node 732). In one aspect, virtual endpoints may receive messages from the local bus node 712 or 732, just like real endpoints, and may forward messages over the distributed bus. As such, the virtual endpoints may forward messages to the local bus nodes 712 and 732 from the endpoint multiplexed distributed bus connection. Furthermore, in one embodiment, virtual endpoints that correspond to virtual endpoints on a remote device may be reconnected at any time to accommodate desired topologies of specific transport types. In such an aspect, UNIX based virtual endpoints may be considered local and as such may not be considered candidates for reconnection. Further, TCP-based virtual endpoints may be optimized for one hop routing (e.g., each bus node 712 and 732 may be directly connected to each other). Still further, Bluetooth-based virtual endpoints may be optimized for a single pico-net (e.g., one master and n slaves) in which the Bluetooth-based master may be the same bus node as a local master node.

At message sequence step 762, the bus node 712 and the bus node 732 may exchange bus state information to merge bus instances and enable communication over the distributed bus. For example, in one embodiment, the bus state information may include a well-known to unique endpoint name mapping, matching rules, routing group, or other suitable information. In one embodiment, the state information may be communicated between the bus node 712 and the bus node 732 instances using an interface with local endpoints 714 and 734 communicating with using a distributed bus based local name. In another aspect, bus node 712 and bus node 732 may each may maintain a local bus controller responsible for providing feedback to the distributed bus, wherein the bus controller may translate global methods, arguments, signals, and other information into the standards associated with the distributed bus. At message sequence step 764, the bus node 712 and the bus node 732 may communicate (e.g., broadcast) signals to inform the respective local endpoints 714 and 734 about any changes introduced during bus node connections, such as described above. In one embodiment, new and/or removed global and/or translated names may be indicated with name owner changed signals. Furthermore, global names that may be lost locally (e.g., due to name collisions) may be indicated with name lost signals. Still further, global names that are transferred due to name collisions may be indicated with name owner changed signals and unique names that disappear if and/or when the bus node 712 and the bus node 732 become disconnected may be indicated with name owner changed signals.

As used above, well-known names may be used to uniquely describe local endpoints 714 and 734. In one embodiment, when communications occur between Device A 710 and Device B 730, different well-known name types may be used. For example, a device local name may exist only on the bus node 712 associated with Device A 710 to which the bus node 712 directly attaches. In another example, a global name may exist on all known bus nodes 712 and 732, where only one owner of the name may exist on all bus segments. In other words, when the bus node 712 and bus node 732 are joined and any collisions occur, one of the owners may lose the global name. In still another example, a translated name may be used when a client is connected to other bus nodes associated with a virtual bus. In such an aspect, the translated name may include an appended end (e.g., a local endpoint 714 with well-known name "org.foo" connected to the distributed bus with Globally Unique Identifier "1234" may be seen as "G1234.org.foo").

At message sequence step 766, the bus node 712 and the bus node 732 may communicate (e.g., broadcast) signals to inform other bus nodes of changes to endpoint bus topologies. Thereafter, traffic from local endpoint 714 may move through virtual endpoints to reach intended local endpoint 734 on Device B 730. Further, in operation, communications between local endpoint 714 and local endpoint 734 may use routing groups. In one aspect, routing groups may enable endpoints to receive signals, method calls, or other suitable information from a subset of endpoints. As such, a routing name may be determined by an application connected to a bus node 712 or 732. For example, a P2P application may use a unique, well-known routing group name built into the application. Further, bus nodes 712 and 732 may support registering and/or de-registering of local endpoints 714 and 734 with routing groups. In one embodiment, routing groups may have no persistence beyond a current bus instance. In another aspect, applications may register for their preferred routing groups each time they connect to the distributed bus. Still further, groups may be open (e.g., any endpoint can join) or closed (e.g., only the creator of the group can modify the group). Yet further, a bus node 712 or 732 may send signals to notify other remote bus nodes or additions, removals, or other changes to routing group endpoints. In such embodiments, the bus node 712 or 732 may send a routing group change signal to other group members whenever a member is added and/or removed from the group. Further, the bus node 712 or 732 may send a routing group change signal to endpoints that disconnect from the distributed bus without first removing themselves from the routing group.

Tables 1 and 2 define various terms and acronyms used in the present disclosure.

TABLE 1

Terms

| Term | Definition |
| --- | --- |
| AllJoyn framework | Open source peer-to-peer framework that allows for abstraction of low-level network concepts and APIs. |
| AllJoyn Controller Device | Also referred to as Controller. An AllJoyn Device which is able to control another AllJoyn Device that advertises its Control Interfaces. |
| AllJoyn Controlled Device | Also referred to as Controllee. An AllJoyn Device which advertises its Control Interfaces, so that other AllJoyn Devices may control it. |
| End-User | The physical person interacting with AllJoyn Devices and Applications. |
| Delegation | Providing a right to grant rights |
| Grant | Providing a right |

TABLE 2

Acronyms

| Acronym | Definition |
| --- | --- |
| AJ | AliJoyn |
| GUID | Globally Unique Identifier. A 128 bit identifier generated randomly in a way that the probability of collision is negligible. |
| TC | Thin Client |
| ECDHE | Ephemeral Elliptic Curve Diffie-Hellman key exchange |

The goal of a proximity-based P2P protocol security service, such as the AllJoyn™ Security Service provided by QUALCOMM Incorporated®, is to allow a controlled device (or controllee) to restrict access to secure interfaces and/or secure objects based on the controllee's relationship with the controller. In addition to the secure channel between the controller and controllee, such a security service will manage a database of credentials and the Access Control Lists (ACLs) for accessing device applications.

The set of either the secure objects or the secure interfaces that a specific controller may have access to is grouped into a "role." A controller may have access to one or more roles. Roles are setup by the controllee's developers and are typically not configurable after deployment.

Every controlee may have one or more owner controllers. The owner controllers are responsible for maintaining the security service databases. Owner controllers may grant access to other controllers by identifying them by either an OpenID or a local GUID, for example.

Since all devices on a proximity-based P2P protocol network may not have direct internet access (which is required for OpenID verification), all networks that require OpenID authentication may need to run a Security Bridge Service (SBS). The SBS will take a local request for OpenID verification and perform the authentication by communicating with the cloud.

OpenID is a global identifier (ID) that provides coverage for many popular services (e.g., Yahoo!® and Google®). With OpenID, consumers know their friends' and family's global identities or can request them. There is no need for consumers to create or share identities and credentials for access to their devices. Nor do consumers need to remember identities for different locations.

Figure 8:
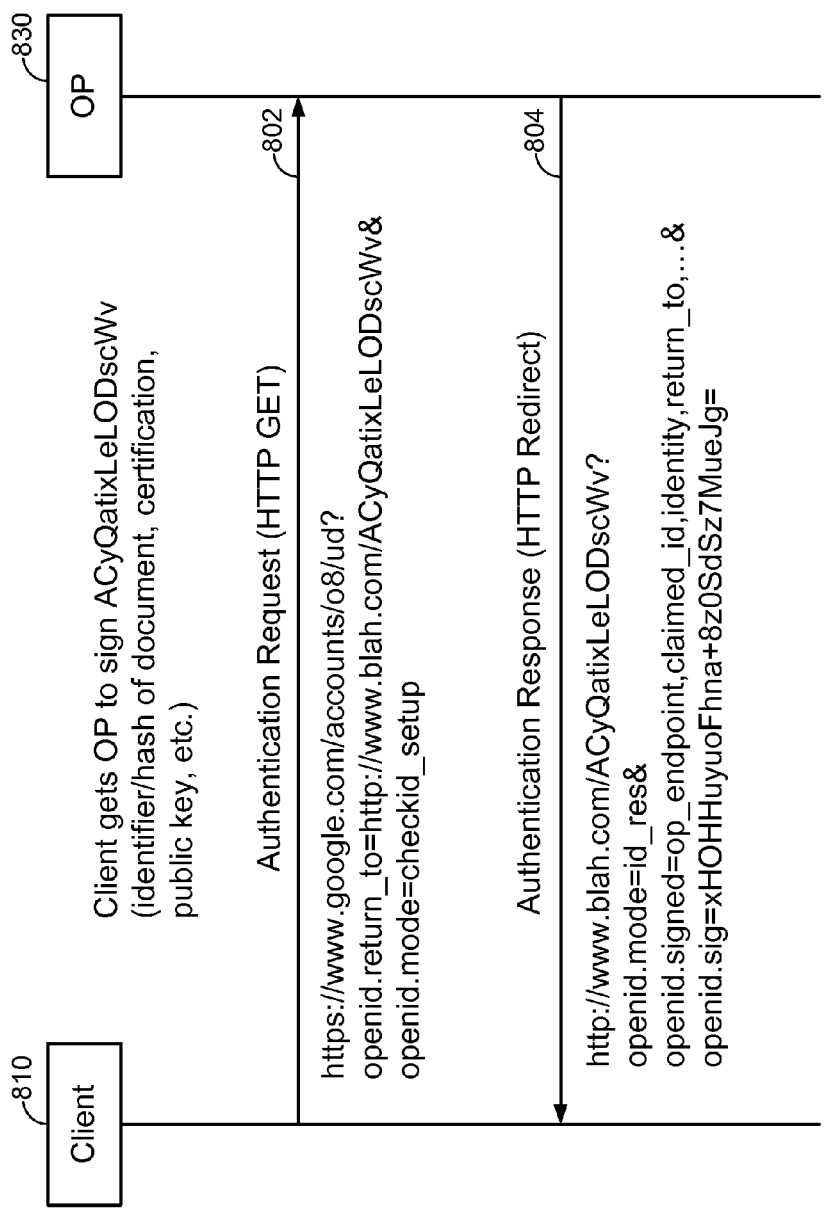
FIG. 8 illustrates an exemplary system architecture for the security service of the present disclosure.

FIG. 8 illustrates an exemplary flow for using an OpenID/OAuth/FaceConnect provider (OP) 830 for authentication, in accordance with an aspect of the disclosure. The OpenID/OAuth provider 830 may correspond to server 400 in FIG. 4. At 802, a client 810 (which may correspond to IoT device 200A in FIG. 2A when IoT device 200A is embodied as a cell phone, smartphone, desktop computer, laptop computer, tablet computer, PDA, etc.) sends an authentication request (e.g., an HTTP GET) to the OpenID/OAuth provider 830. At 804, the OpenID/OAuth provider 830 sends an authentication response (e.g., HTTP Redirect) to the client 810.

Note that the OpenID/OAuth provider 830 sends the response as an HTTP redirect. However, in cases where the client 810 is not a web browser, there is no need to follow the redirect. Instead, the only information retrieved from the redirect is the signature. The result is a signature binding the return_to (containing hash/object) and OpenID identity. In addition, the client 810's email address can be included in this exchange.

Figure 9:
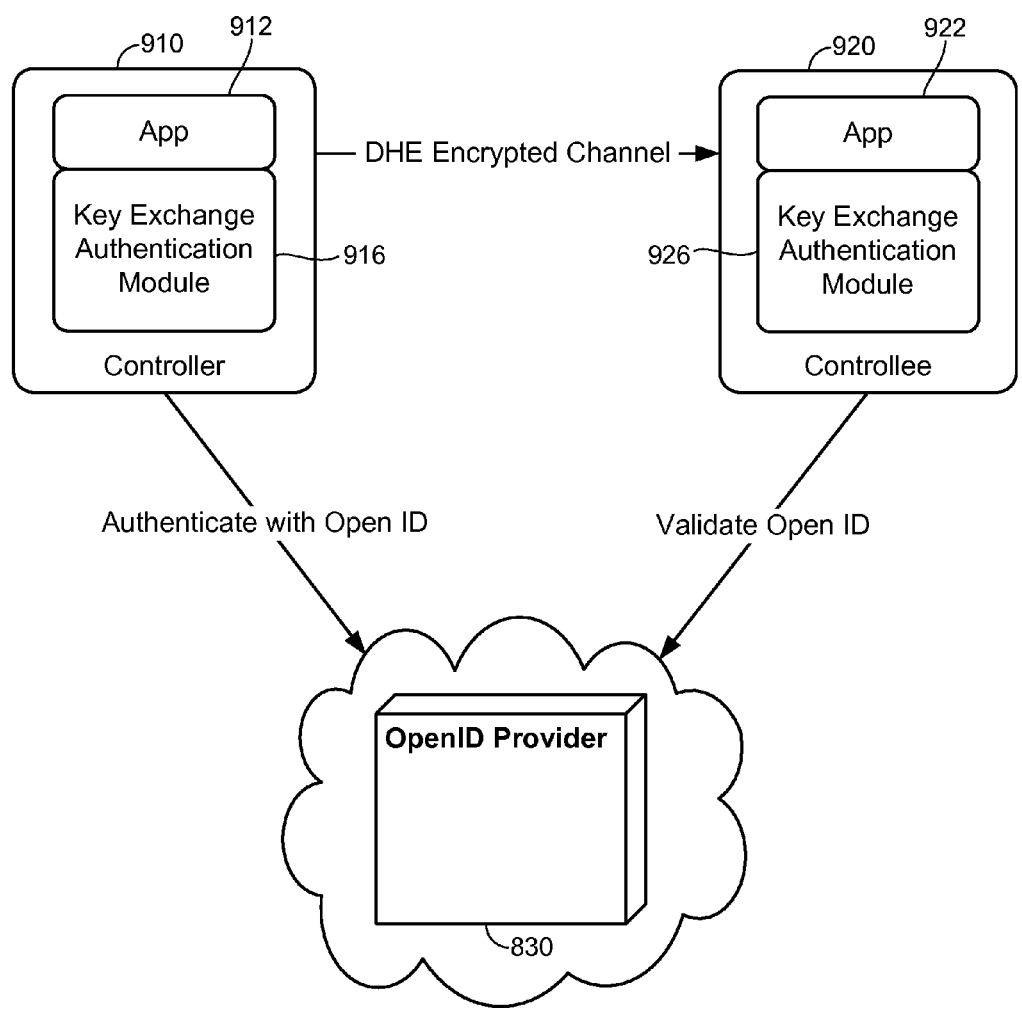
FIG. 9 illustrates an exemplary flow for using an OpenID provider for authentication, in accordance with an aspect of the disclosure.

FIG. 9 illustrates an exemplary system architecture for the security service of the present disclosure. The system illustrated in FIG. 9 includes a controller device 910 running an application 912, a controllee device 920 running an application 922, and an OpenID/OAuth provider 830. The controller device 910 may be a "smart" device, and may correspond to IoT device 200A in FIG. 2A when IoT device 200A is embodied as a cell phone, smartphone, desktop computer, laptop computer, tablet computer, PDA, etc. The controllee device 920 may be any IoT device, such as IoT device 200A or 200B in FIGS. 2A and 2B, respectively. The applications 912 and 922 can communicate with each other over an encrypted channel, but the channel is not validated until the controller authenticates with OpenID and the controllee validates the OpenID.

Both the controller device 910 and the controllee device 920 also include key exchange authentication modules 916 and 926, respectively, in order to perform the functionality described herein. The key exchange authentication modules 916/926 may correspond to the key exchange authentication module 216 in FIGS. 2A/2B.

Each application 912 and 922 has a GUID assigned for authentication purposes. All encryption related data for the given application is stored in the key store indexed by the GUID. Typical encryption data includes the master secret, session key, and group key. The disclosure extends the keystore to store the Diffie-Hellman keys, end user open ID information, and permissions.

When an end-user uses a controller, such as controller device 910, he/she can validate the application 912 with a particular controllee, such as controllee device 920, by performing an authentication procedure with his/her OpenID/OAuth provider, such as OpenID/OAuth provider (OP) 830. This procedure associates the application's authentication GUID with the user's OpenID identifiers. In order to perform the validation described herein, the security service needs to have access to the end-user's OpenID credentials. The security service can obtain the end-user's OpenID credentials when the end-user provides the credentials to his/her OpenID logon site.

In the area of exchanging cryptographic keys, the Diffie-Hellman key exchange (DHE) is a practical method to establish an encrypted channel between the two peer applications 912 and 922. It allows two parties that have no prior knowledge of each other to jointly establish a shared secret key over an insecure communications channel. This key can then be used to encrypt subsequent communications using a symmetric key cipher. However, the communication is susceptible to a man-in-the-middle attack.

There are methods that can detect a communication breach for a Diffie-Hellman key exchange. The present disclosure provides a method to use an end-user federated login, such as OpenID or OAuth protocols, to authenticate a key exchange mechanism, such as the Diffie-Hellman key exchange, in order for the communicating parties to detect a breach. The disclosed method requires the end-user to login to his/her account (either interactively or with stored login information). Regardless of the source, the login to the end-user's account is performed with the OpenID protocol (example providers include Google® and Yahoo!®) or the OAuth protocol (example providers include Facebook®) to grant access to the application, and uses the signing capability of the OpenID or OAuth protocol to sign a token that is only known by both communication parties in order to verify that the communication channel is not breached.

Figure 10:
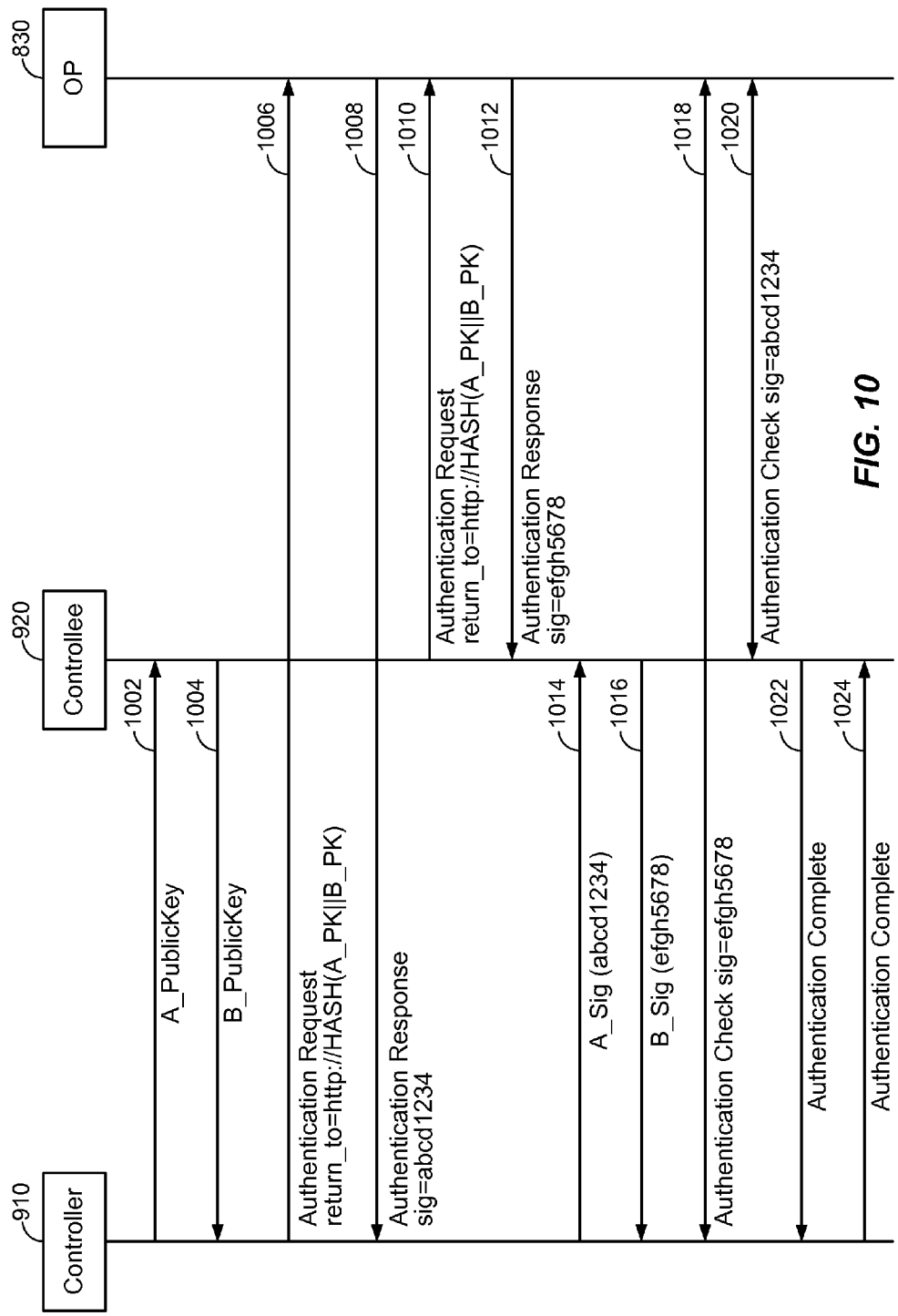
FIG. 10 illustrates an exemplary flow for establishing a secure channel between two clients, in accordance with an aspect of the disclosure.

FIG. 10 illustrates an exemplary flow for establishing a secure channel (e.g., via Diffie-Hellman exchange) between the controller device 910 and the controllee device 920 in FIG. 9, in accordance with an aspect of the disclosure. In this case, both clients sign and verify something common (e.g., the Diffie-Hellman session parameters). Alternatively, both clients could sign their public keys.

The functionality illustrated with reference to FIG. 10 may be performed by each device's key exchange authentication module 916/926 cooperatively with each device's processor, transceiver, and/or I/O interface. For example, where the key exchange authentication module is an executable module, the processor of the controller device 910/controllee device 920 may execute the functionality of the key exchange authentication module 916/926, respectively, thereby causing the transceiver to communicate with the OP 820 and the controllee device 920/controller device 910.

At 1002-1004, the controller device 910 and the controllee device 920 exchange Diffie-Hellman keys and generate a shared secret. At 1002, the controller device 910 sends its Diffie-Hellman key (represented as "A_PublicKey") to the controllee device 920. At 1004, the controllee device 920 sends its Diffie-Hellman key (represented as "B_PublicKey") to the controller device 910. After this exchange, the controller device 910 and the controllee device 920 each generate an identifier for the exchange. This is either the public keys themselves, a hash of them, or a verifier calculated using a pseudo-random function (PRF).

At 1006, the controller device 910 sends an authentication request to the OpenID/OAuth provider 830. The request contains the identifier generated for the exchange at 1002-1004. For OpenID and OAuth, the identifier is embedded in the return_to parameter. In the example of FIG. 10, the identifier for the exchange comprises a hash of "A_PublicKey" and "B_PublicKey," represented as "HASH(A_P-KIB_PK)." At 1008, the controller device 910 receives a signed response from the OpenID/OAuth provider 830. The signature covers the identifier.

At 1010, the controllee device 920 sends an authentication request to the OpenID/OAuth provider 830 independent of the request sent by the controller device 910 at 1006. This request also contains the identifier generated for the exchange at 1002-1004. For OpenID and OAuth, the identifier is embedded in the return_to parameter. At 1012, the controllee device 920 receives a signed response from the OpenID/OAuth provider 830. The signature covers the identifier.

At 1014-1016, the controller device 910 and the controllee device 920 exchange the signed responses. At 1018-1020, both the controller device 910 and the controllee device 920 (independently) make authentication checks with the OpenID/OAuth provider 830. This check verifies that the data exchange at 1014-1016 is valid, and thus the identifier is valid. At 1022-1024, both the controller device 910 and the controllee device 920 exchange Authentication Complete acknowledgments.

Figure 11:
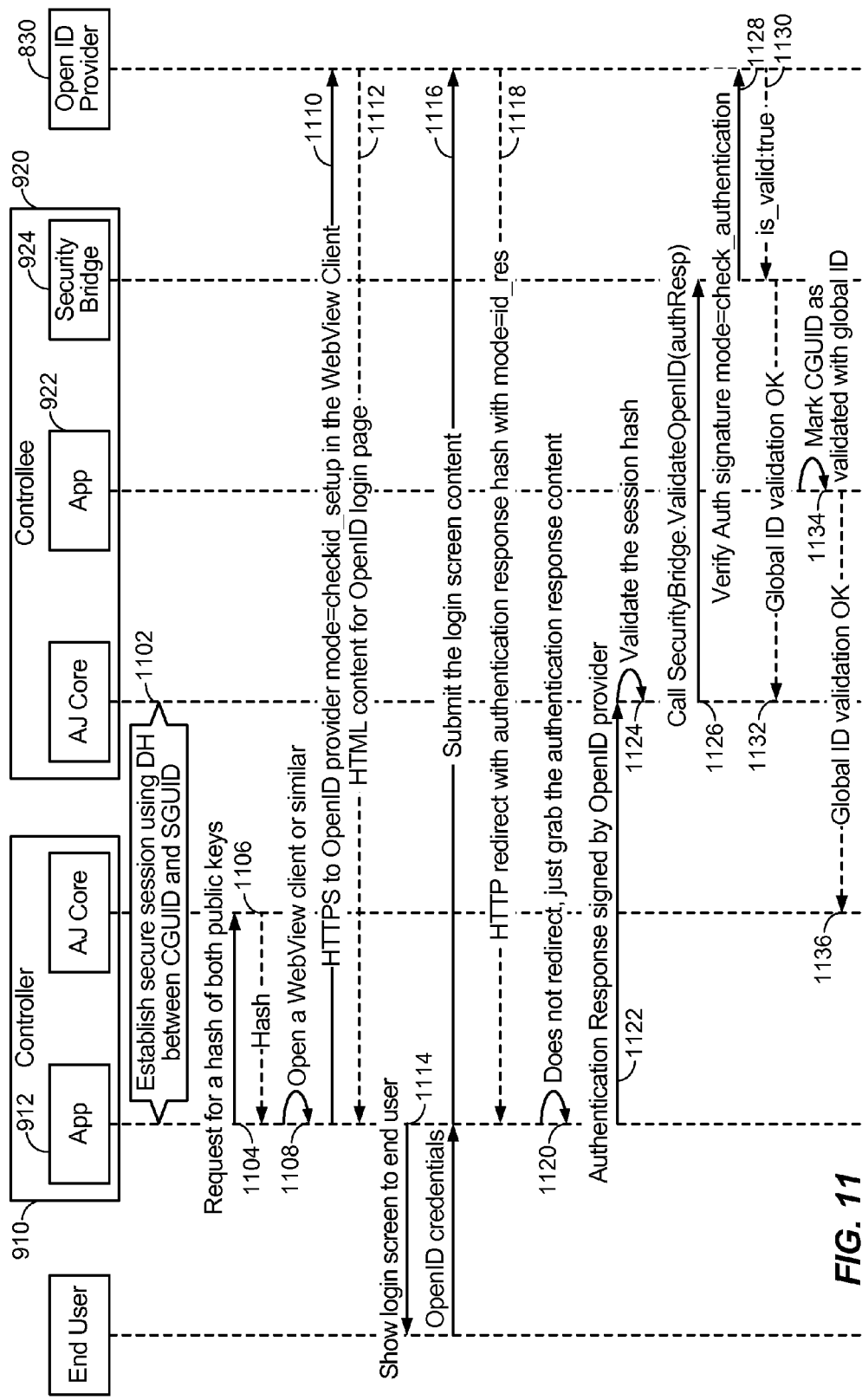
FIG. 11 illustrates an OpenID validation between the controller and the controllee illustrated in FIG. 8, where the controllee includes a bundled security bridge, in accordance with an aspect of the disclosure.

FIG. 11 is an example of the flow illustrated in FIG. 10 using an OpenID provider, i.e., OpenID provider 830. Specifically, FIG. 11 illustrates an exemplary flow for an OpenID validation between the controller device 910 and the controllee device 920 illustrated in FIG. 9, where the controllee device 920 includes a bundled security bridge 924. The flow illustrated in FIG. 11 shows the procedure to validate the end-user's OpenID credentials. In the example of FIG. 11, the controller device 910 is assumed to be a smart device, such as a smartphone, that includes a controller application. The controllee device 920 uses the bundled security bridge 924 to verify with the Open ID provider. The developer of the controllee device 920 may decide whether to include the security bridge 924 feature in the controllee device 920. The security bridge 924 may be based on HTTPS codes and a guaranteed internet connection. Although devices 910 and 920 are illustrated as a controller and a controllee, in the example of FIG. 11, they may be any two peer devices.

The functionality illustrated with reference to FIG. 11 may be performed by each device's key exchange authentication module 916/926 cooperatively with each device's processor, transceiver, and/or I/O interface. For example, where the key exchange authentication module is an executable module, the processor of the controller device 910/controllee device 920 may execute the functionality of the key exchange authentication module 916/926, respectively, thereby causing the controller application 912/controllee application 922, the security bridge 924, and the respective AllJoyn™ cores to perform the functionality illustrated in FIG. 11.

The flow illustrated in FIG. 11 begins at 1102 with the controller application 912 on controller device 910 establishing a secure session using Diffie-Hellman between the Client (CGUID) and the Service (SGUID). Note that the secure channel is only setup if it is not already available. At 1104, the controller application 912 sends a request for a hash of both public keys (i.e., the Diffie-Hellman keys) to, for example, the AllJoyn™ core in the controller device 910. At 1108, in response to receiving the hash from the AllJoyn™ core at 1106, the controller application 912 opens a WebView client, or other similar client. For example, the controller application 912 may use the WebViewClient on Android or the UIWebView on iOS to open a web browser session.

At 1110, after opening the WebView client, the controller application 912 sends an HTTPS "mode=checked_setup" message to the OpenID provider 830 in the WebView client. The controller application 912 may use the domain www.alljoyn-security.org in the OpenID login request and add the session key hash in the return address. At 1112, the OpenID provider 830 responds with the HTML content for the OpenID login page. At 1114, the controller application 912 displays the login screen to the end user, or alternatively, accesses the end user's previously stored login information to login, and receives the end user's OpenID credentials. Additionally, if the end user is currently logged in and the end user's OpenID credentials are still valid, these OpenID credentials can be used without requiring an additional logon.

In response to receiving the end user's OpenID credentials, at 1116, the controller application 912 submits the login screen content to the OpenID provider 830. At 1118, the OpenID provider 830 responds with an HTML redirect with the authentication response hash with "mode=id_res." At 1120, the controller application 912 does not perform the redirect, but rather, extracts the content of the authentication response. At 1122, the controller application 912 sends the authentication response signed by the OpenID provider 830 to, for example, the AllJoyn™ core on the controllee device 920.

In response to receiving the authentication response from the controller application 912, at 1124, the AllJoyn™ core validates the session hash. At both 1120 and 1124, the session ID hash in the openid.return_to field is validated to ensure the integrity of the two public keys. At 1126, the AllJoyn™ core calls the internal security bridge 924 with the function ValidateOpenID(authResp). At 1128, the security bridge 924 calls the OpenID provider 830 to verify the authorization signature using mode=check_authentication. At 1130, the OpenID provider 830 responds with the message "is_valid:true." Note, however, that if the session hash is different from the value used in the controller device 910, then check_authorization fails the signature check.

At 1132, the security bridge 924 sends a message to the AllJoyn™ core indicating that the global ID validation is "OK." In response, at 1134, the AllJoyn™ core marks the CGUID as validated with the global ID, and at 1136, sends a message to the controller application 912 indicating that the global ID validation is "OK."

Figure 12:
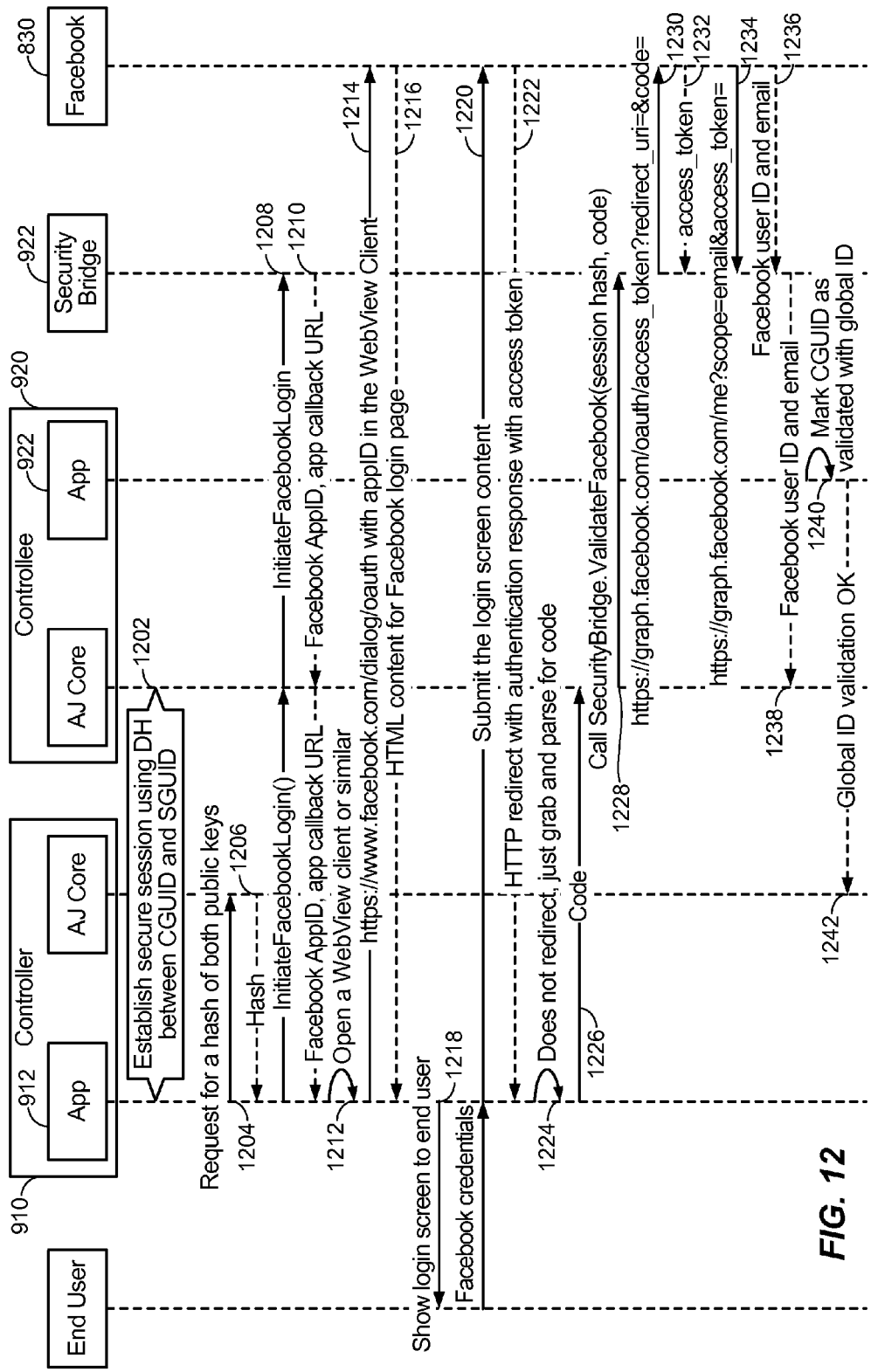
FIG. 12 illustrates an OAuth validation between the controller and the controllee illustrated in FIG. 8, where the controllee does not include a bundled security bridge, in accordance with an aspect of the disclosure.

FIG. 12 is an example of the flow illustrated in FIG. 10 using an OAuth provider, i.e., OAuth provider 830, such as Facebook®. Specifically, FIG. 12 illustrates an OAuth validation between the controller device 910 and the controllee device 920 illustrated in FIG. 9, where the controllee device 920 does not include a bundled security bridge, as it did in FIG. 11. In the example illustrated in FIG. 12, the OAuth provider is illustrated as being Facebook®. In order to support the validation of Facebook® accounts, the controllee application 922 or the security bridge 924 needs to provide the Facebook® application ID, as Facebook® requires such information. Specifically, Facebook® requires a registered application ID in order to invoke the OAuth login screen. Although devices 910 and 920 are illustrated as a controller and a controllee, in the example of FIG. 12, they may be any two peer devices.

The functionality illustrated with reference to FIG. 12 may be performed by each device's key exchange authentication module 916/926 cooperatively with each device's processor, transceiver, and/or I/O interface. For example, where the key exchange authentication module is an executable module, the processor of the controller device 910/controllee device 920 may execute the functionality of the key exchange authentication module 916/926, respectively, thereby causing the controller application 912/controllee application 922 and the respective AllJoyn™ cores to perform the functionality illustrated in FIG. 12.

The flow illustrated in FIG. 12 begins at 1202 with the controller application 912 establishing a secure session using Diffie-Hellman between the CGUID and the SGUID. Note that the secure channel is only setup if it is not already available. At 1204, the controller application 912 sends a request for a hash of both public keys to, for example, the AllJoyn™ core in the controller device 910. In response to receiving the hash from the AllJoyn™ core at 1206, at 1208, the controller application 912 initiates a logon to Facebook®. In response to receiving the logon request, at 1210, the external security bridge 924 sends the Facebook™ AppID and application callback URL to, for example, the controllee device 920's AllJoyn™ core, which forwards this information to the controller application 912.

At 1212, the controller application 912 opens a WebView client, or similar client, and, at 1214, sends an OAuth request with the AppID to the Facebook® server in the WebView client. For example, the controller application 912 may use the WebViewClient on Android or the UIWebView on iOS to open a web browser session. The controller application 912 may use the Facebook® application callback URL as the redirect_uri, and add the session key hash callback URL and the state field. At 1216, the Facebook® server responds with the HTML content for the Facebook® login page. At 1218, the controller application 912 displays the login screen to the end user, and receives the end user's Facebook® credentials.

In response to receiving the end user's credentials, at 1220, the controller application 912 submits the login screen content to the Facebook® server. At 1222, the Facebook® server responds with an HTML redirect with the authentication response with an access token. At 1224, the controller application 912 does not perform the redirect, but rather, extracts and parses the authentication response for the code. The controller application 912 also validates the session ID hash in the state field. At 1226, the controller application 912 sends the code to the AllJoyn™ core on the controllee device 920.

In response to receiving the code from the controller application 912, at 1228, the AllJoyn™ core calls the external security bridge 924 with the function ValidateFacebook(session hash, code). At 1230, the security bridge 924 then calls the Facebook® server with the request "https://graph.facebook.com/oauth/access_token?redirect_uri=&code=," and at 1232, receives the access token in response. Note that exchanging a code for an access token is an OAuth-specific method. In addition, the redirect_uri is formed with the application callback URL and the session hash. The access token call fails if the redirect_uri does not match the controller, which validates the session hash.

At 1234, the security bridge 924 calls the Facebook® server with the request "https://graph.facebook.com/me?scope=email&access_token=," and at 1236, receives the end user's Facebook® username and email in response. At 1238, the security bridge 924 sends the end user's Facebook® username and email to the controllee device 920's AllJoyn™ core, which, at 1240, marks the CGUID as validated with the global ID. At 1242, the AllJoyn™ core sends a message to the controller application 912 indicating that the global ID validation is "OK."

As will be appreciated, although FIGS. 11 and 12 illustrate various messages being exchanged with the AllJoyn™ cores in the controller device 910 and/or controllee device 920, this is only an exemplary embodiment, and other communication protocols may be used.

The following table describes the required information data that the controller device 910 and controllee device 920 have to provide to the global ID provider.

TABLE 3

Required Application Data for Global ID Validation

| Global ID Provider | Controller | Controllee/ SecurityBridge | End-user friendly ID |
|---|---|---|---|
| OpenID | None | None | Email address |
| Facebook ® (using OAuth) | None | Valid Facebook ® Application ID and application secret | Email address |

Figure 13:
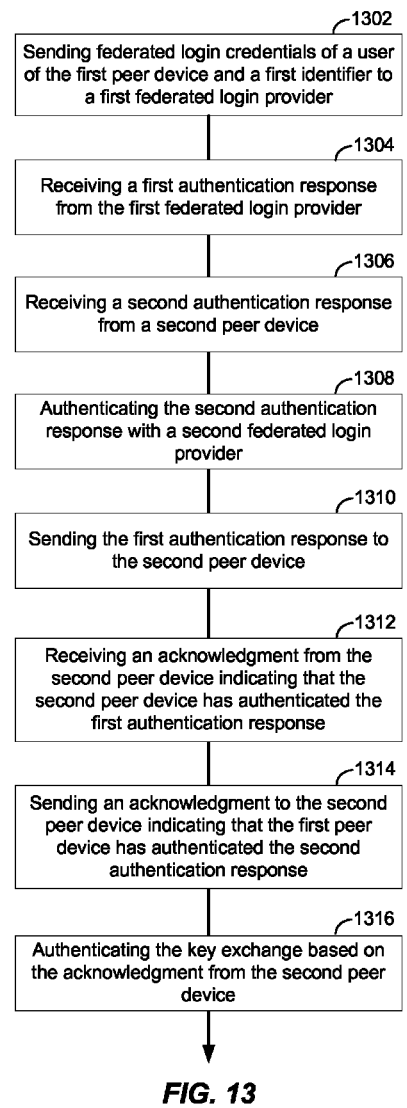
FIG. 13 illustrates an exemplary flow for authenticating a key exchange between a first peer device and a second peer device according to an aspect of the disclosure.

FIG. 13 illustrates an exemplary flow for authenticating a key exchange between a first peer device and a second peer device according to an aspect of the disclosure. The flow illustrated in FIG. 13 may be performed by the controller device 910 or the controllee device 920 in FIG. 9. For convenience, the flow illustrated in FIG. 13 will be described as being performed by a controller device 910.

The flow illustrated in FIG. 13 begins at 1302, where the first peer device sends federated login credentials of a user of the first peer device and a first identifier to a first federated login provider, such as at 1006 of FIG. 10, 1116 of FIG. 11, and 1220 of FIG. 12. Similarly, the second peer device sends the federated login credentials of the user and a second identifier to a second federated login provider, such as at 1010 of FIG. 10.

The first federated login provider and the second federated login provider may be the same or different federated login providers. However, both the first federated login provider and the second federated login provider should support the same federated login protocol, such as OpenID, OAuth, or FaceConnect.

The first identifier and the second identifier may be the same or different identifiers. If the same, the first identifier and the second identifier may be a common hash or a computed verifier. If different, the first identifier may be a first public key generated by the first peer device and the second identifier may be a second public key generated by the second peer device.

At 1304, the first peer device receives a first authentication response from the first federated login provider, such as at 1008 of FIG. 10, 1118 of FIG. 11, and 1222 of FIG. 12. Similarly, the second peer device receives a second authentication response from the second federated login provider, such as at 1012 of FIG. 10.

At 1306, the first peer device receives the second authentication response from the second peer device, such as at 1016 of FIG. 10.

At 1308, the first peer device authenticates the second authentication response with the second federated login provider, such as at 1018 of FIG. 10.

At 1310, the first peer device sends the first authentication response to the second peer device, such as at 1014 of FIG. 10. The second peer device authenticates the first authentication response with the first federated login provider, such as at 1020 of FIG. 10, 1126-1132 of FIG. 11, and 1228-1238 of FIG. 12.

At 1312, the first peer device receives an acknowledgment from the second peer device indicating that the second peer device has authenticated the first authentication response, such as at 1022 of FIG. 10, 1136 of FIG. 11, and 1242 of FIG. 12.

At 1314, the first peer device sends an acknowledgment to the second peer device indicating that the first peer device has authenticated the second authentication response, such as at 1024 of FIG. 10.

At 1316, the first peer device authenticates the key exchange based on the acknowledgment from the second peer device, wherein the second peer device authenticates the key exchange based on the acknowledgment from the first peer device.

Figure 14:
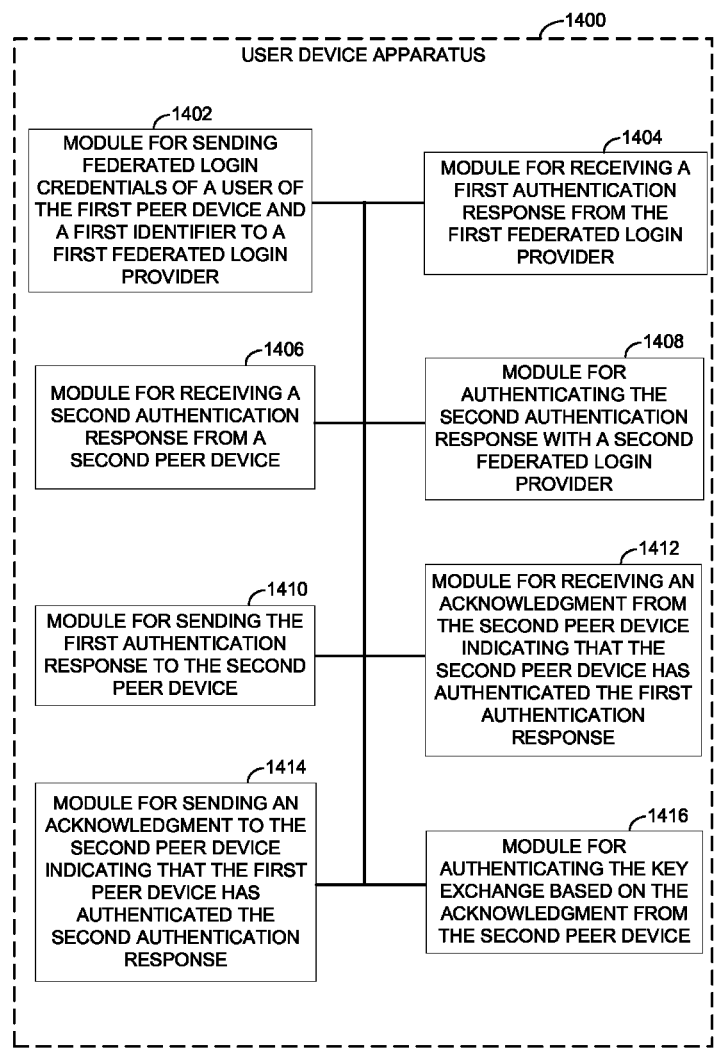
FIG. 14 is a simplified block diagram of several sample aspects of an apparatus configured to support communication as taught herein.

FIG. 14 illustrates an example user device apparatus 1400 represented as a series of interrelated functional modules. A module for sending 1402 may correspond at least in some aspects to, for example, a communication device, such as transceiver 206 in FIG. 2A, as discussed herein. A module for receiving 1404 may correspond at least in some aspects to, for example, a communication device, such as transceiver 206 in FIG. 2A, as discussed herein. A module for receiving 1406 may correspond at least in some aspects to, for example, a communication device, such as transceiver 206 in FIG. 2A, as discussed herein. A module for authenticating 1408 may correspond at least in some aspects to, for example, a communication device, such as transceiver 206 in FIG. 2A, cooperatively with a processing system, such as key exchange authentication module 216 in conjunction with processor 208 in FIG. 2A, as discussed herein. A module for sending 1410 may correspond at least in some aspects to, for example, a communication device, such as transceiver 206 in FIG. 2A, as discussed herein. A module for receiving 1412 may correspond at least in some aspects to, for example, a communication device, such as transceiver 206 in FIG. 2A, as discussed herein. A module for sending 1414 may correspond at least in some aspects to, for example, a communication device, such as transceiver 206 in FIG. 2A, as discussed herein. A module for authenticating 1416 may correspond at least in some aspects to, for example, a communication device, such as transceiver 206 in FIG. 2A, cooperatively with a processing system, such as key exchange authentication module 216 in conjunction with processor 208 in FIG. 2A, as discussed herein.

The functionality of the modules of FIG. 14 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 14, as well as other components and functions described herein, may be implemented using any suitable means. Such means also may be implemented, at least in part, using corresponding structure as taught herein. For example, the components described above in conjunction with the "module for" components of FIG. 14 also may correspond to similarly designated "means for" functionality. Thus, in some aspects one or more of such means may be implemented using one or more of processor components, integrated circuits, or other suitable structure as taught herein.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of authenticating a key exchange between a first peer device and a second peer device, comprising:

sending, by the first peer device, federated login credentials of a user of the first peer device and a first identifier to a first federated login provider, wherein the second peer device sends the federated login credentials of the user and a second identifier to a second federated login provider;

receiving, by the first peer device, a first authentication response from the first federated login provider, wherein the second peer device receives a second authentication response from the second federated login provider;

receiving, by the first peer device, the second authentication response from the second peer device;

authenticating, by the first peer device, the second authentication response with the second federated login provider;

sending, by the first peer device, the first authentication response to the second peer device, wherein the second peer device authenticates the first authentication response with the first federated login provider;

receiving, by the first peer device, an acknowledgment from the second peer device indicating that the second peer device has authenticated the first authentication response;

sending, by the first peer device, an acknowledgment to the second peer device indicating that the first peer device has authenticated the second authentication response; and authenticating, by the first peer device, the key exchange based on the acknowledgment from the second peer device, wherein the second peer device authenticates the key exchange based on the acknowledgment from the first peer device.

2. The method of claim 1, wherein receiving the first authentication response comprises receiving an HTML redirect with the first authentication response.

3. The method of claim 2, wherein the first peer device sends the first authentication response to the second peer device instead of following the HTML redirect.

4. The method of claim 1, further comprising:
establishing a secure session between the first peer device and the second peer device using the key exchange before sending the federated login credentials of the user and the first identifier to the first federated login provider.

5. The method of claim 4, wherein the secure session is established using a Diffie-Helman key exchange.

6. The method of claim 1, wherein the first federated login provider and the second federated login provider are different federated login providers, and wherein the first federated login provider and the second federated login provider comprise OpenID providers, OAuth providers, or FaceConnect providers.

7. The method of claim 1, wherein the first federated login provider and the second federated login provider are the same federated login provider.

8. The method of claim 1, wherein the first peer device comprises a controller peer device and the second peer device comprises a controlee peer device.

9. The method of claim 1, further comprising:
generating, by the first peer device, a first public key for the key exchange;
sending, by the first peer device, the first public key to the second peer device; and
receiving, by the first peer device, a second public key from the second peer device.

10. The method of claim 9, wherein the first identifier comprises the first public key, a combination of the first public key and the second public key, a hash of the first public key and the second public key, or a verifier of the first public key and the second public key calculated using a pseudo-random function (PRF).

11. The method of claim 1, wherein the first identifier and the second identifier are the same identifier, and wherein the first identifier and the second identifier comprise a common hash or a computed verifier.

12. The method of claim 1, wherein the first identifier and the second identifier are different identifiers, and wherein the first identifier comprises a first public key generated by the first peer device and the second identifier comprises a second public key generated by the second peer device.

13. The method of claim 1, wherein authenticating the key exchange based on the acknowledgment from the second peer device comprises authenticating the key exchange based on receiving the acknowledgment from the second peer device.

14. An apparatus for authenticating a key exchange between a first peer device and a second peer device, comprising:
a transceiver of the first peer device configured to:
send federated login credentials of a user of the first peer device and a first identifier to a first federated login provider, wherein the second peer device sends the federated login credentials of the user and a second identifier to a second federated login provider;
receive a first authentication response from the first federated login provider, wherein the second peer device receives a second authentication response from the second federated login provider; and
receive the second authentication response from the second peer device; and
at least one processor of the first peer device configured to authenticate the second authentication response with the second federated login provider,
wherein the transceiver is further configured to:
send the first authentication response to the second peer device, wherein the second peer device authenticates the first authentication response with the first federated login provider;
receive an acknowledgment from the second peer device indicating that the second peer device has authenticated the first authentication response; and
send an acknowledgment to the second peer device indicating that the first peer device has authenticated the second authentication response, and
wherein the at least one processor is further configured to authenticate the key exchange based on the acknowledgment from the second peer device, wherein the second peer device authenticates the key exchange based on the acknowledgment from the first peer device.

15. The apparatus of claim 14, wherein the transceiver being configured to receive the first authentication response comprises the transceiver being configured to receive an HTML redirect with the first authentication response.

16. The apparatus of claim 15, wherein the first peer device sends the first authentication response to the second peer device instead of following the HTML redirect.

17. The apparatus of claim 14, wherein the at least one processor is further configured to:
establish a secure session between the first peer device and the second peer device using the key exchange before the federated login credentials of the user and the first identifier are sent to the first federated login provider.

18. The apparatus of claim 17, wherein the secure session is established using a Diffie-Helman key exchange.

19. The apparatus of claim 14, wherein the first federated login provider and the second federated login provider are different federated login providers, and wherein the first federated login provider and the second federated login provider comprise OpenID providers, OAuth providers, or FaceConnect providers.

20. The apparatus of claim 14, wherein the first federated login provider and the second federated login provider are the same federated login provider.

21. The apparatus of claim 14, wherein the first peer device comprises a controller peer device and the second peer device comprises a controlee peer device.

22. The apparatus of claim 14, wherein:
the transceiver is further configured to generate a first public key for the key exchange,
the transceiver is further configured to send the first public key to the second peer device, and
the at least one processor is further configured to receive a second public key from the second peer device.

23. The apparatus of claim 22, wherein the first identifier comprises the first public key, a combination of the first public key and the second public key, a hash of the first public key and the second public key, or a verifier of the first public key and the second public key calculated using a pseudo-random function (PRF).

24. The apparatus of claim 14, wherein the first identifier and the second identifier are the same identifier, and wherein the first identifier and the second identifier comprise a common hash or a computed verifier.

25. The apparatus of claim 14, wherein the first identifier and the second identifier are different identifiers, and wherein the first identifier comprises a first public key generated by the first peer device and the second identifier comprises a second public key generated by the second peer device.

26. The apparatus of claim 14, wherein the at least one processor being configured to authenticate the key exchange based on the acknowledgment from the second peer device comprises the at least one processor being configured to authenticate the key exchange based on reception of the acknowledgment from the second peer device.

27. An apparatus for authenticating a key exchange between a first peer device and a second peer device, comprising:
means for sending, by the first peer device, federated login credentials of a user of the first peer device and a first identifier to a first federated login provider, wherein the second peer device sends the federated login credentials of the user and a second identifier to a second federated login provider;
means for receiving, by the first peer device, a first authentication response from the first federated login provider, wherein the second peer device receives a second authentication response from the second federated login provider;
means for receiving, by the first peer device, the second authentication response from the second peer device;
means for authenticating, by the first peer device, the second authentication response with the second federated login provider;
means for sending, by the first peer device, the first authentication response to the second peer device, wherein the second peer device authenticates the first authentication response with the first federated login provider;
means for receiving, by the first peer device, an acknowledgment from the second peer device indicating that the second peer device has authenticated the first authentication response;
means for sending, by the first peer device, an acknowledgment to the second peer device indicating that the first peer device has authenticated the second authentication response; and
means for authenticating, by the first peer device, the key exchange based on the acknowledgment from the second peer device, wherein the second peer device authenticates the key exchange based on the acknowledgment from the first peer device.

28. The apparatus of claim 27, further comprising:
means for establishing a secure session between the first peer device and the second peer device using the key exchange before the federated login credentials of the user and the first identifier are sent to the first federated login provider.

29. A non-transitory computer-readable medium for authenticating a key exchange between a first peer device and a second peer device, comprising:
at least one instruction to send, by the first peer device, federated login credentials of a user of the first peer device and a first identifier to a first federated login provider, wherein the second peer device sends the federated login credentials of the user and a second identifier to a second federated login provider;
at least one instruction to receive, by the first peer device, a first authentication response from the first federated login provider, wherein the second peer device receives a second authentication response from the second federated login provider;
at least one instruction to receive, by the first peer device, the second authentication response from the second peer device;
at least one instruction to authenticate, by the first peer device, the second authentication response with the second federated login provider;
at least one instruction to send, by the first peer device, the first authentication response to the second peer device, wherein the second peer device authenticates the first authentication response with the first federated login provider;
at least one instruction to receive, by the first peer device, an acknowledgment from the second peer device indicating that the second peer device has authenticated the first authentication response;
at least one instruction to send, by the first peer device, an acknowledgment to the second peer device indicating that the first peer device has authenticated the second authentication response; and
at least one instruction to authenticate, by the first peer device, the key exchange based on the acknowledgment from the second peer device, wherein the second peer device authenticates the key exchange based on the acknowledgment from the first peer device.

30. The non-transitory computer-readable medium of claim 29, further comprising:
at least one instruction to establish a secure session between the first peer device and the second peer device using the key exchange before the federated login credentials of the user and the first identifier are sent to the first federated login provider.

* * * * *